United States Patent
Manzano et al.

(10) Patent No.: US 11,188,121 B2
(45) Date of Patent: Nov. 30, 2021

(54) CASE FOR PORTABLE ELECTRONIC COMPUTING DEVICE

(71) Applicant: Pioneer Square Brands, Inc., Seattle, WA (US)

(72) Inventors: Megan Elizabeth Zumel Manzano, Seattle, WA (US); Michael Cooper Ferren, Camas, WA (US); Jaimie Emerald Chan, Renton, WA (US); Brian Lewis Piper, Seattle, WA (US)

(73) Assignee: PIONEER SQUARE BRANDS, INC., McLean, VA (US)

( * ) Notice: Subject to any disclaimer, the term of this patent is extended or adjusted under 35 U.S.C. 154(b) by 0 days.

(21) Appl. No.: 17/340,018

(22) Filed: Jun. 6, 2021

(65) Prior Publication Data
US 2021/0294380 A1 Sep. 23, 2021

Related U.S. Application Data

(62) Division of application No. 17/075,469, filed on Oct. 20, 2020, now Pat. No. 11,029,726, which is a division of application No. 16/669,273, filed on Oct. 30, 2019, now Pat. No. 10,845,843.

(51) Int. Cl.
*G06F 1/16* (2006.01)

(52) U.S. Cl.
CPC .......... *G06F 1/1628* (2013.01); *G06F 1/1616* (2013.01); *G06F 1/1603* (2013.01); *G06F 1/1656* (2013.01)

(58) Field of Classification Search
CPC .... G06F 1/1616; G06F 1/1628; G06F 1/1654; G06F 1/1656; G06F 1/1669
See application file for complete search history.

(56) References Cited

U.S. PATENT DOCUMENTS

| | | | | |
|---|---|---|---|---|
| 5,835,344 A * | 11/1998 | Alexander | ............ | G06F 1/1628 361/679.46 |
| 6,179,122 B1 * | 1/2001 | Moncrief | .............. | G06F 1/1628 206/320 |
| 7,031,148 B1 * | 4/2006 | Lin | ....................... | G06F 1/1616 150/154 |
| 7,643,274 B2 * | 1/2010 | Bekele | ...................... | G06F 1/16 361/679.02 |
| 10,585,450 B1 * | 3/2020 | Giazzon | ................ | G06F 1/1616 |
| 10,845,844 B1 * | 11/2020 | Chan | ..................... | G06F 1/1628 |
| 2006/0081489 A1 * | 4/2006 | Wheeler | ............... | G06F 1/1628 206/320 |

(Continued)

*Primary Examiner* — Nidhi Thaker
(74) *Attorney, Agent, or Firm* — Grandview Law

(57) ABSTRACT

Systems and methods are involved with but are not limited to an apparatus including a traylike structure including one or more apertures being positioned along one or more of a first wall portion, a second wall portion, a third wall portion, and a fourth wall portion; and a flangelike structure including one or more protrusions being positioned to extend from one or more of a first lower interior surface of a first elongated member, a second lower interior surface of a second elongated member, and a third lower interior surface of the third elongated member to engage with the one or more apertures of the traylike structure thereby coupling the flangelike structure with the traylike structure. In addition, other aspects are described in the claims, drawings, and text forming a part of the present disclosure.

18 Claims, 26 Drawing Sheets

(56) References Cited

U.S. PATENT DOCUMENTS

| | | | |
|---|---|---|---|
| 2008/0202959 A1* | 8/2008 | Chu | G06F 1/1628 206/320 |
| 2010/0277858 A1* | 11/2010 | Zhou | G06F 1/1669 361/679.17 |
| 2014/0071607 A1* | 3/2014 | Frinak | G06F 1/1628 361/679.09 |
| 2019/0018451 A1* | 1/2019 | Fenton | G06F 1/1613 |

* cited by examiner

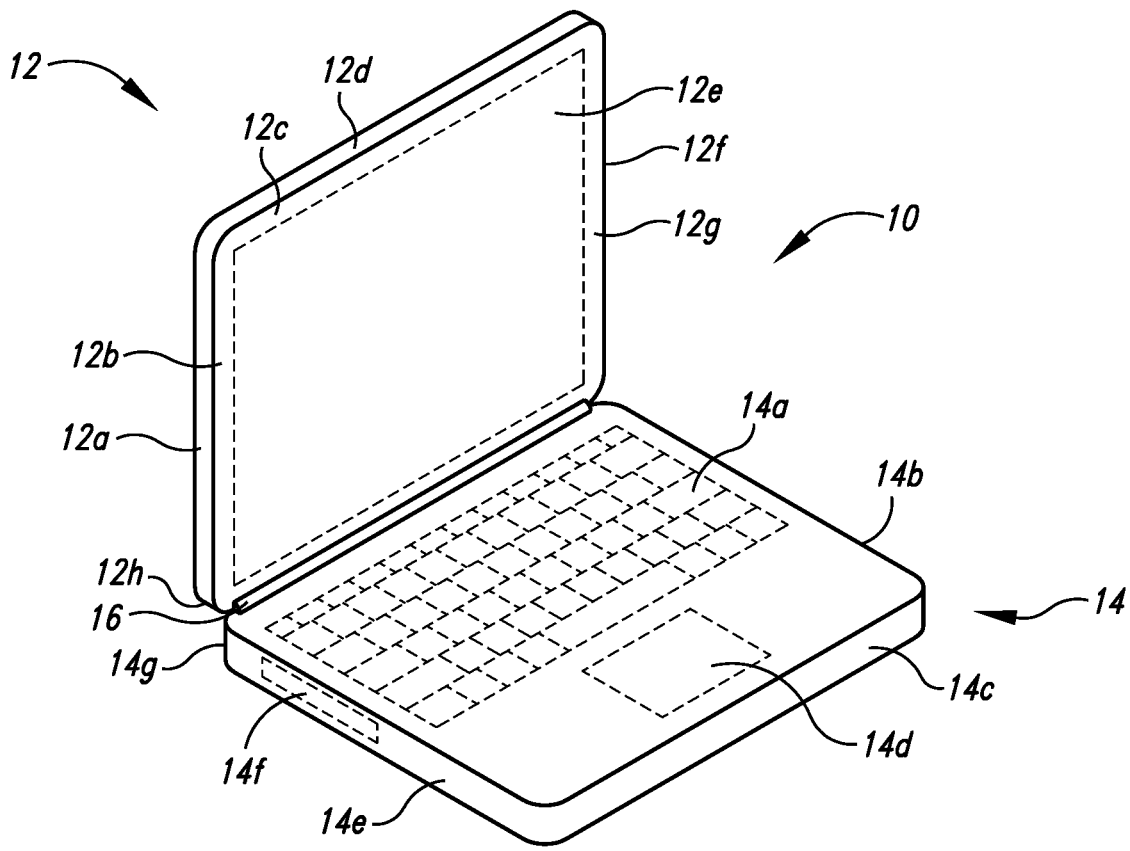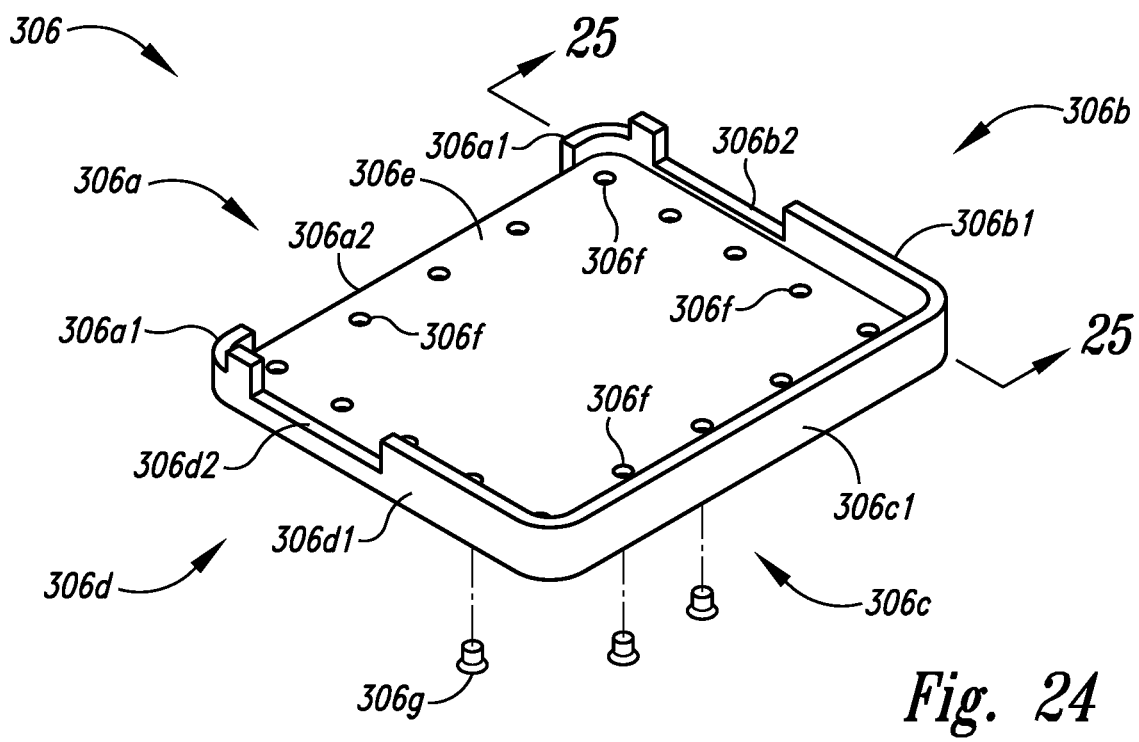
Fig. 24

CASE FOR PORTABLE ELECTRONIC COMPUTING DEVICE

SUMMARY

In one or more aspects, an apparatus includes, but is not limited to a case including an inner case portion including a traylike structure including a baseplate planar structure including a first side portion, a second side portion being substantially perpendicular to the first side portion, a third side portion being substantially perpendicular to the second side portion, and a fourth side portion being substantially perpendicular to the first side portion, a first wall portion including a first end surface, the first wall portion extending substantially perpendicular from the first side portion of the baseplate planar structure to the first end surface, a second wall portion including a second end surface, the second wall portion extending substantially perpendicular from the second side portion of the baseplate planar structure to the second end surface, the second wall portion being substantially perpendicular to the first wall portion, a third wall portion including a third end surface, the third wall portion extending substantially perpendicular from the third side portion of the baseplate planar structure to the third end surface, the third wall portion being substantially perpendicular to the second wall portion, a fourth wall portion including a fourth end surface, the fourth wall portion extending substantially perpendicular from the fourth side portion of the baseplate structure to the fourth end surface, the fourth wall portion being substantially perpendicular to the third wall portion, and one or more apertures being positioned along one or more of the first end surface of the first wall portion, the second end surface of the second wall portion, the third end surface of the third wall portion, and the fourth end surface of the fourth wall portion; and a flangelike structure including a first elongated member including a first upper exterior surface and a first lower interior surface, a second elongated member including a second upper exterior surface and a second lower interior surface, a third elongated member including a third upper exterior surface and a third lower interior surface, and one or more protrusions being positioned to extend from one or more of the first lower interior surface of the first elongated member, the second lower interior surface of the second elongated member, and the third lower interior surface of the third elongated member to engage with the one or more apertures of the traylike structure thereby coupling the flangelike structure with the traylike structure, as the second elongated member being substantially perpendicular to the first elongated member and the third elongated member being substantially perpendicular with the second elongated member, and as the first lower interior surface of the flangelike structure being adjacent with the second end surface of the second wall portion of the traylike structure, the second lower interior surface of the flangelike structure being adjacent with the third end surface of the third wall portion of the traylike structure, and the third lower interior surface of the flangelike structure being adjacent with the fourth end surface of the fourth wall portion of the traylike structure, and as the one or more of the first elongated member, the second elongated member, and the third elongated member being sized to overhang the baseplate planar structure as the flangelike structure is coupled with the traylike structure.

In one or more aspects, an apparatus includes, but is not limited to a case including an inner case portion including a first frame portion including a first side portion including a base wall portion, a first wall portion extending substantially perpendicular from the base wall portion, and a second wall portion extending substantially perpendicular from the base wall portion, an end portion positioned on one or more of the base wall portion, the first wall portion, and the second wall portion, one or more first connectors positioned adjacent to the end portion, the base wall portion, the first wall portion, and the second wall portion structurally arranged to form a first channel, a second side portion extending substantially perpendicular from the first side portion, the second side portion including a base wall portion, a first wall portion extending substantially perpendicular from the base wall portion, a second wall portion extending substantially perpendicular from the base wall portion, the base wall portion, the first wall portion, and the second wall portion structurally arranged to form a second channel, and a third side portion being substantially perpendicular to the second side portion, the third side portion including a base wall portion, a first wall portion extending substantially perpendicular from the base wall portion, an end portion positioned on one or more of the base wall portion and the first wall portion, one or more second connectors positioned adjacent to the end portion, the base wall portion, and the first wall portion structurally arranged to form a third channel, and a second frame portion including a first side portion including a base wall portion, a first wall portion extending substantially perpendicular from the base wall portion, and a second wall portion extending substantially perpendicular from the base wall portion, an end portion positioned on one or more of the base wall portion, the first wall portion, and the second wall portion, one or more first connectors positioned adjacent to the end portion, the base wall portion, the first wall portion, and the second wall portion structurally arranged to form a first channel, a second side portion extending substantially perpendicular from the first side portion, the second side portion including a base wall portion, a first wall portion extending substantially perpendicular from the base wall portion, a second wall portion extending substantially perpendicular from the base wall portion, the base wall portion, the first wall portion, and the second wall portion structurally arranged to form a second channel, and a third side portion being substantially perpendicular to the second side portion, the third side portion including a base wall portion, a first wall portion extending substantially perpendicular from the base wall portion, an end portion positioned on one or more of the base wall portion and the first wall portion, one or more second connectors positioned adjacent to the end portion, the base wall portion, and the first wall portion structurally arranged to form a third channel, the one or more first connectors of the first frame portion positioned to engage with the one or more first connectors of the second frame portion as the first frame portion is coupled with the second frame portion, the one or more second connectors of the first frame portion positioned to engage with the one or more second connectors of the second frame portion as the first frame portion is coupled with the second frame portion.

In one or more aspects, an apparatus includes, but is not limited to a case including an inner case portion including a keyboard case assembly including a frame structure including a first side portion including a base wall portion, a first wall portion extending substantially perpendicular from the base wall portion, and a second wall portion extending substantially perpendicular from the base wall portion, an end portion positioned on one or more of the base wall portion, the first wall portion, and the second wall portion, a slot longitudinally extended along the base wall portion, the base wall portion, the first wall portion, and the second wall portion structurally arranged to form a first channel, a second side portion extending substantially perpendicular from the first side portion, the second side portion including a base wall portion, a first wall portion extending substantially perpendicular from the base wall portion, a second wall portion extending substantially perpendicular from the base wall portion, a slot longitudinally extended along the base wall portion, the base wall portion, the first wall portion, and the second wall portion structurally arranged to form a second channel, a third side portion being substantially perpendicular to the second side portion, the third side portion including a base wall portion, a first wall portion extending substantially perpendicular from the base wall portion, an end portion positioned on one or more of the base wall portion and the first wall portion, the base wall portion, and the first wall portion structurally arranged to form a third channel, and a base structure including a baseplate planar portion including a first edge portion, a second edge portion, and a third edge portion, a first wall portion perpendicularly extending from the baseplate planar portion, a second wall portion perpendicularly extending from the baseplate planar portion the slot of the base wall portion of the first side portion and the slot of the base wall portion of the third side portion positioned to engage with the third edge portion and the first edge portion, of the baseplate planar portion, respectively for coupling of the frame structure with the base structure; and a display case traylike assembly including a baseplate planar portion, a first wall portion extending substantially perpendicularly from the baseplate planar portion, a second wall portion extending substantially perpendicularly from the base plate planar portion, the second wall portion being substantially perpendicular to the first wall portion, a third wall portion extending substantially perpendicularly from the base plate planar portion, the third wall portion being substantially perpendicular to the second wall portion, and a fourth wall portion extending substantially perpendicularly from the base plate planar portion, the fourth wall portion being substantially perpendicular to the third wall portion.

In addition to the foregoing, other aspects are described in the claims, drawings, and text forming a part of the disclosure set forth herein. Various other aspects are set forth and described in the teachings such as text (e.g., claims and/or detailed description) and/or drawings of the present disclosure. The foregoing is a summary and thus may contain simplifications, generalizations, inclusions, and/or omissions of detail; consequently, those skilled in the art will appreciate that the summary is illustrative only and is NOT intended to be in any way limiting. Other aspects, features, and advantages of the devices and/or processes and/or other subject matter described herein will become apparent in the teachings set forth herein.

BRIEF DESCRIPTION OF THE FIGURES

For a more complete understanding of embodiments, reference now is made to the following descriptions taken in connection with the accompanying drawings. The use of the same symbols in different drawings typically indicates similar or identical items, unless context dictates otherwise.

With reference now to the figures, shown are one or more examples of case for portable electronic computing case based articles of manufacture, compositions of matter, systems for producing and/or methods for producing same that may provide context, for instance, in introducing one or more processes and/or devices described herein.

FIG. 24 is a front perspective view of a keyboard case assembly for a fifth computer laptop case embodiment along with the conventional laptop computer.

DETAILED DESCRIPTION

Figure 1:
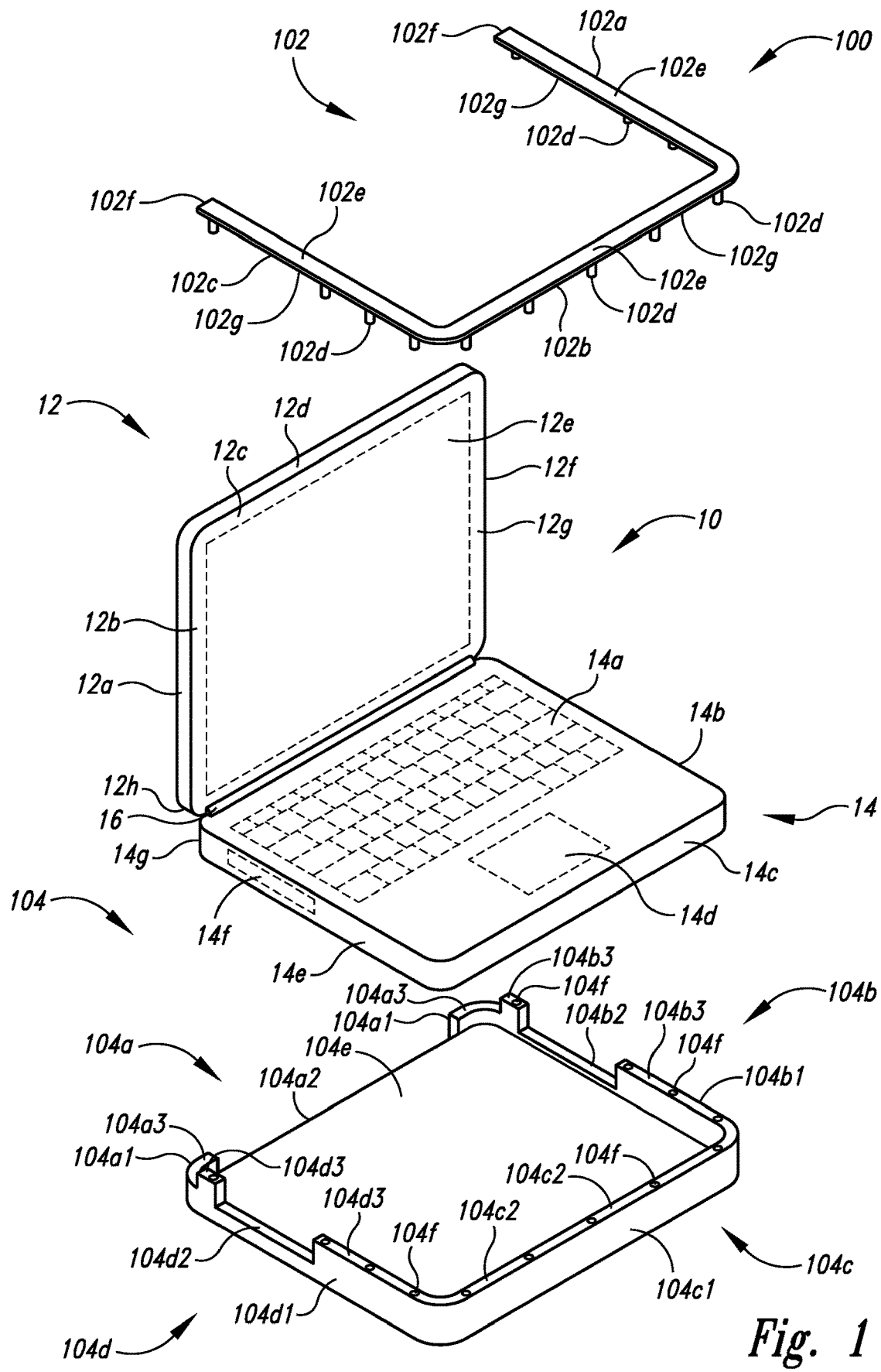
FIG. 1 is a front perspective exploded view of a keyboard case assembly for a first computer laptop case embodiment along with a conventional computer laptop.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

Portable electronic devices, such as laptop-shaped electronic computing devices having stands integrated therein, along with their conventional cases, can pose challenges in ease of use for containment by such cases.

Turning to FIG. 1, shown in front exploded perspective view is conventional laptop 10 having keyboard assembly 14 positioned to be received by keyboard case assembly 100 for engagement therewith. As depicted, conventional laptop 10 includes display assembly 12 and keyboard assembly 14 in which display assembly 12 includes left side portion (first side portion) 12a, left bevel portion (first bevel portion) 12b, top bevel portion (second bevel portion) 12c, top side portion (second side portion) 12d, display 12e, right side portion (third side portion) 12f, right bevel portion (third bevel portion) 12g, bottom side portion (fourth side portion) 12h and back side portion (fifth side portion) 12i. Further depicted in FIG. 1, keyboard assembly 14 includes keyboard 14a, right side portion (first side portion) 14b, front side portion (second side portion) 14c, touch pad 14d, left side portion (third side portion) 14e, media slot 14f, rear side portion (second side portion) 14g, and hinge 16 coupling display assembly 12 with keyboard assembly 14.

Comprising two sections, keyboard case assembly 100 includes flangelike structure 102 and traylike structure 104. The flangelike structure 102 includes right side portion (first side portion) 102a, front side portion (second side portion) 102b, protrusions 102d, top surface (external surface) 102e, ends 102f and lower interior surface 102g.

The traylike structure 104 includes rear side portion (first side portion) 104a, wall portions 104a1, edge portion 104a2, first end surface 104a3, right side portion (second side portion) 104b, expanded wall portion 104b1, recessed wall portion 104b2, second end surface 104b3, front side portion (third side portion) 104c, wall portion 104c1, third end surface 104c2, left side portion (fourth side portion) 104d, expanded wall portion 104d1, recessed wall portion 104d2, fourth end surface 104d3, baseplate planar structure 104e, and apertures 104f being positioned along edge surfaces of expanded wall portion 104b1, wall portion 104c1, and expanded wall portion 104d1.

Figure 2:
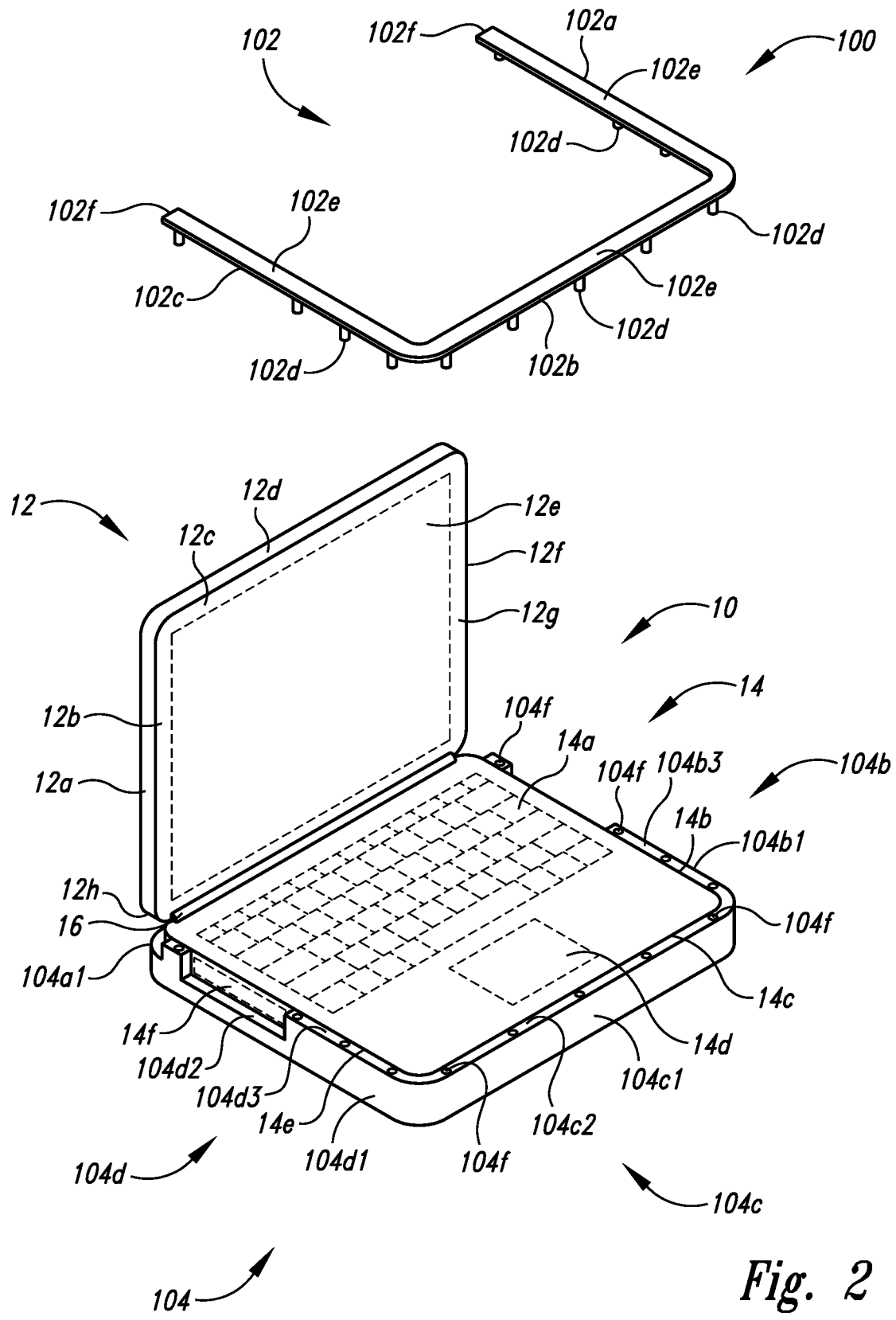
FIG. 2 is a front perspective exploded view of the keyboard case assembly for the first computer laptop case embodiment partially engaged with the conventional computer laptop of FIG. 1.
Figure 3:
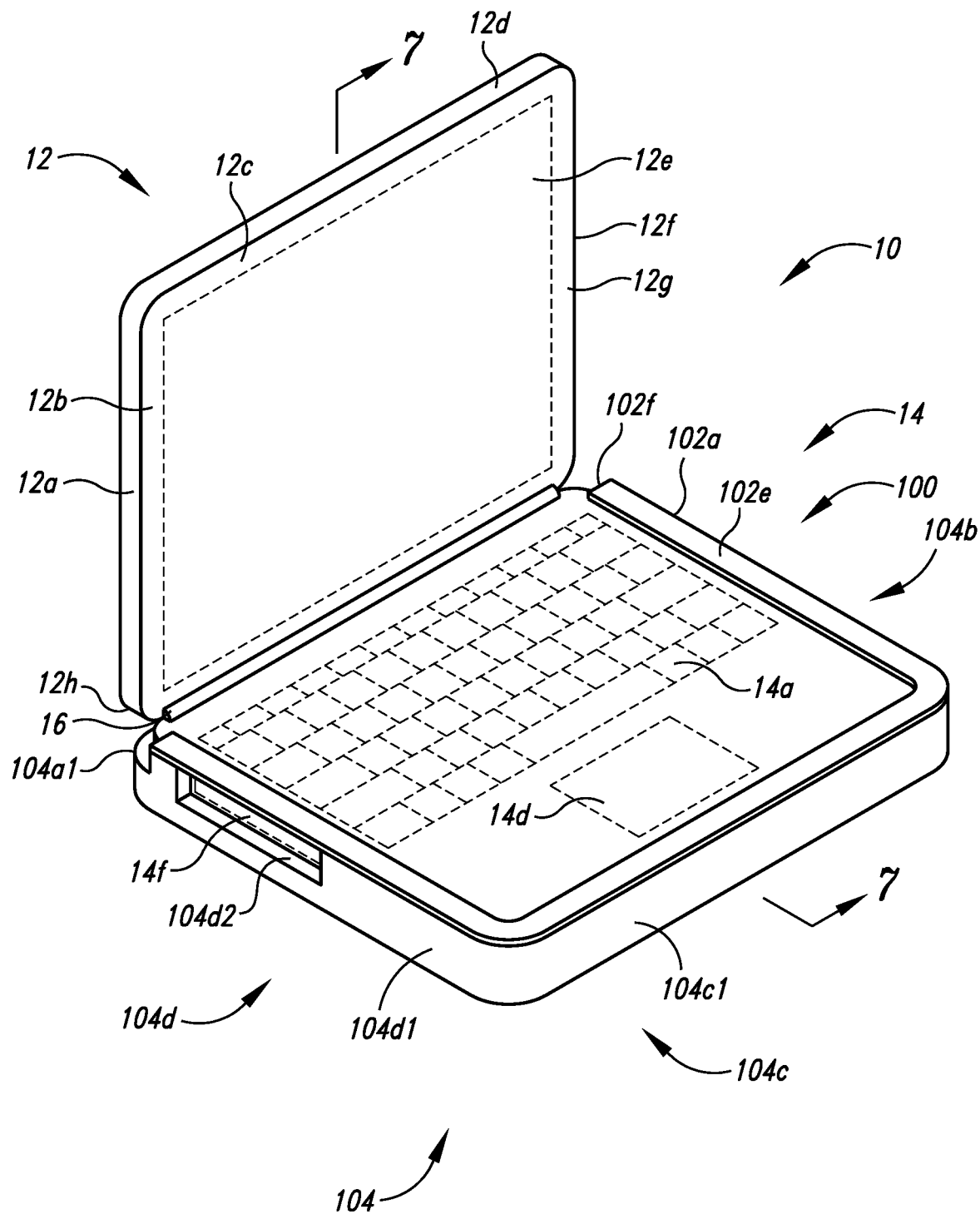
FIG. 3 is a front perspective of the keyboard case assembly for the first computer laptop case embodiment engaged with the conventional computer laptop of FIG. 1.

The protrusions 102d of flangelike structure 102 are sized, shaped, positioned, and extend from lower interior surface 102g for engagement with apertures 104f to couple flangelike structure 102 with traylike structure 104. The protrusions 102d of flangelike structure 102 can be selected as having one or more of the following material characteristics: compressible, threaded, tapered, screw-like, and bolt-like. The flangelike structure 102 can be a single molded piece from a type of plastic or other moldable material or can be constructed from individual pieces such as for each of right side portion (first side portion) 102a, front side portion (second side portion) 102b, first end surface 104a3, and protrusions 102d. Some implementations of protrusions 102d can include barbs, ridges, or tapering to increase grip; other implementation materials for protrusions 102d that are a bit compressible for tight fitting with apertures 104f. Also, protrusions 102d are positioned along right side portion (first side portion) 102a, front side portion (second side portion) 102b, and first end surface 104a3 to allow flangelike structure 102 to partially overlap with keyboard assembly 14 when flangelike structure 102 is coupled with traylike structure 104 for retention of keyboard assembly 14 by keyboard case assembly 100 thereby. The traylike structure 104 can be a single molded piece from a type of plastic or other moldable material or can be constructed from individual pieces. Sizing and shaping of portions of traylike structure 104, such as of rear side portion (first side portion) 104a, right side portion (second side portion) 104b, front side portion (third side portion) 104c, left side portion (fourth side portion) 104d, and baseplate planar structure 104e is conducive with conformably receiving keyboard assembly 14. For instance, wall portions 104a1 are sized and positioned to retain keyboard assembly 14 while being shorter than expanded wall portion 104b1, wall portion 104c1, and expanded wall portion 104d1 to allow display assembly 12 to move according to hinge 16 with respect to keyboard assembly 14. Given the size of wall portions 104a1, edge portion 104a2 is so sized to allow for sizable access to rear of keyboard assembly 14 in case certain models of conventional laptop 10 have various ports or other features that need to be reached while keyboard assembly 14 is being retained by keyboard case assembly 100. Similarly, recessed wall portion 104b2, and recessed wall portion 104d2 are shortened in height to allow access to media ports including media slot 14f of keyboard assembly 14. Turning to FIG. 2, traylike structure 104 is shown coupled to keyboard assembly 14 with flangelike structure 102 to be engaged therewith and further so engaged as shown in FIG. 3 with portions of top surface (external surface) 102e extending over keyboard assembly 14 to thereby secure keyboard assembly 14 within keyboard case assembly 100.

Figure 4:
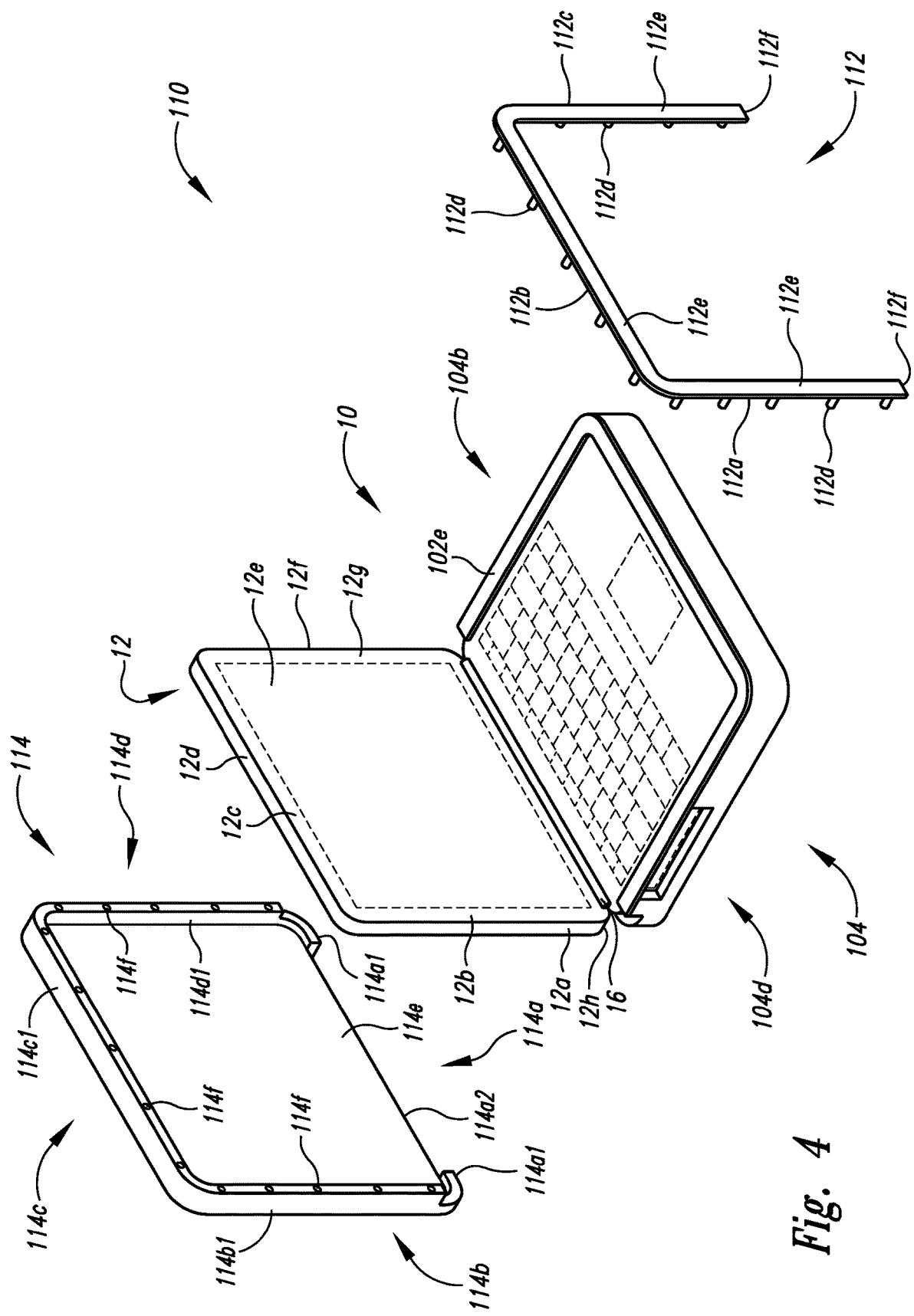
FIG. 4 is a front perspective exploded view of a display case assembly for a first laptop case embodiment along with the conventional computer laptop.
Figure 5:
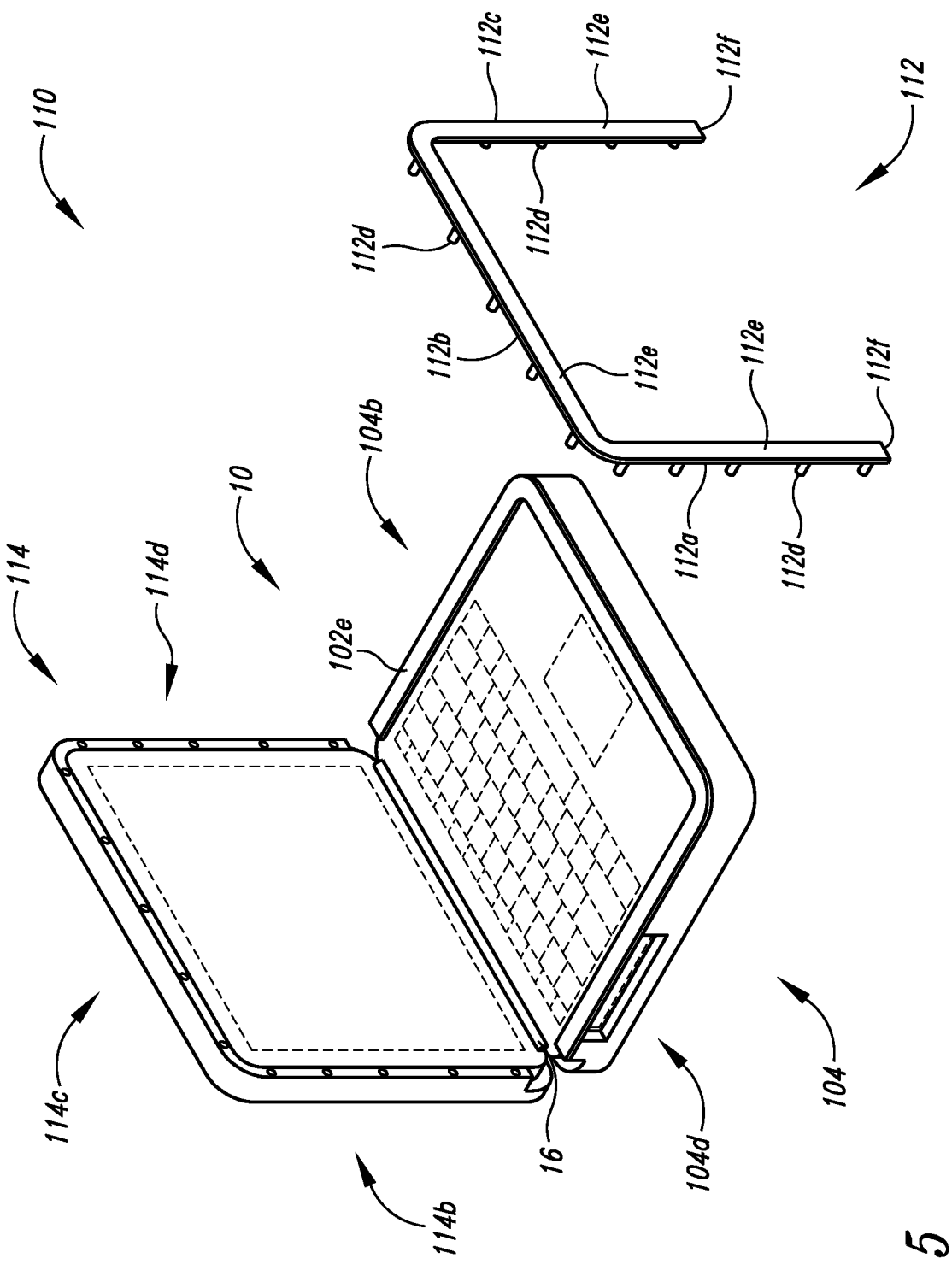
FIG. 5 is a front perspective exploded view of the display case assembly for the first computer laptop case embodiment partially engaged with the conventional computer laptop of FIG. 4.
Figure 6:
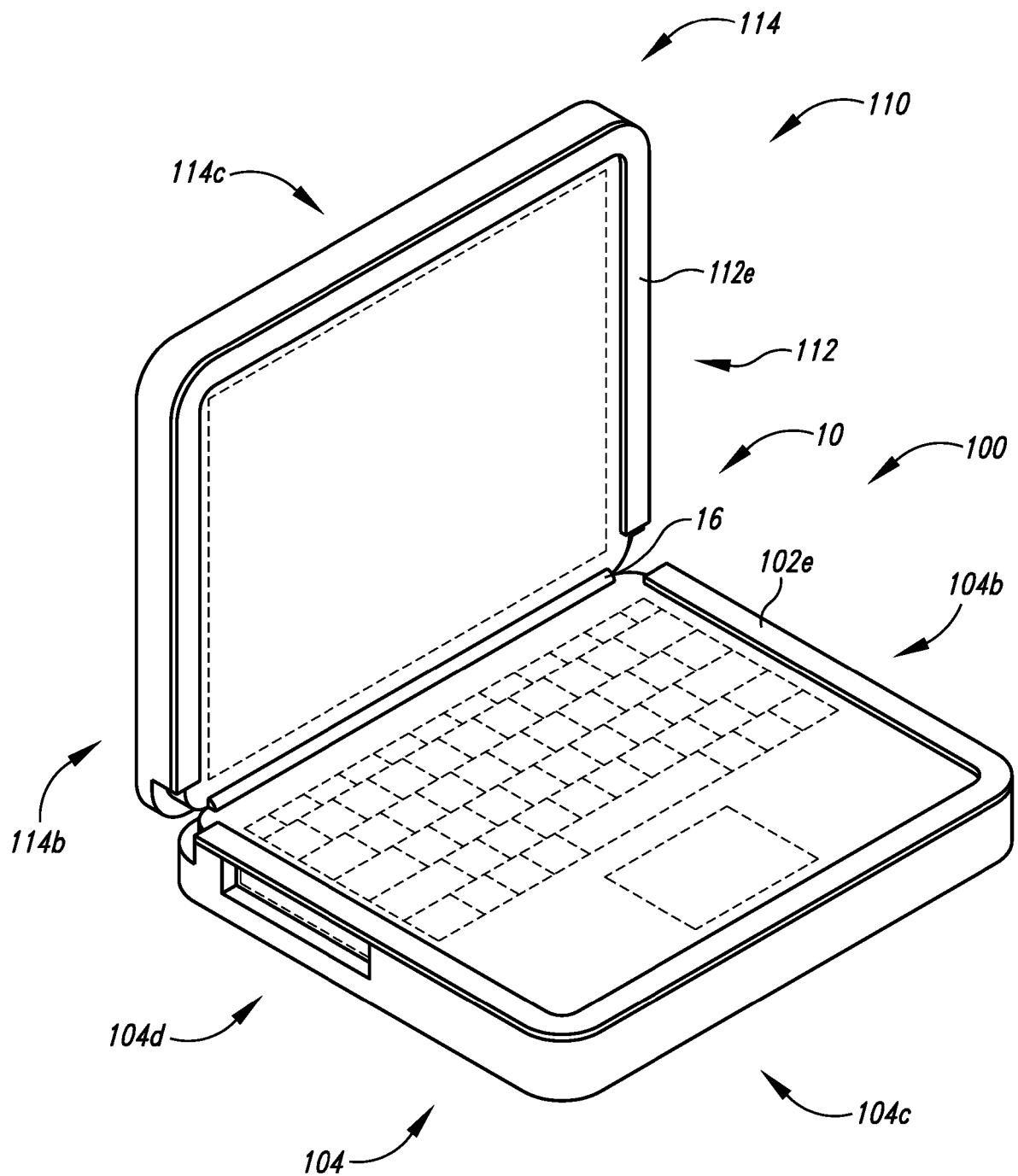
FIG. 6 is a front perspective of the display case assembly for the first computer laptop case embodiment engaged with the conventional computer laptop of FIG. 4.

Turning to FIG. 4, shown in front exploded perspective view is conventional laptop 10 having display assembly 12 positioned for receiving display case assembly 110 for engagement therewith. Having two sections, display case assembly 110 includes flangelike structure 112 and traylike structure 114. The flangelike structure 112 includes right side portion (first side portion) 112a, front side portion (second side portion) 112b, left side portion (third side portion) 112c, protrusions 112d, top surface (external surface) 112e, and ends 112f. The traylike structure 114 includes rear side portion (first side portion) 114a, wall portions 114a1, edge portion 114a2, right side portion (second side portion) 114b, wall portion 114b1, front side portion (third side portion) 114c, wall portion 114c1, left side portion (fourth side portion) 114d, wall portion 114d1, baseplate planar structure 114e, and aperture 114f. The protrusions 112d of flangelike structure 112 are sized, shaped, and positioned for engagement with aperture 114f to couple flangelike structure 112 with traylike structure 114. The flangelike structure 112 can be a single molded piece from a type of plastic or other moldable material or can be constructed from individual pieces such as for each of right side portion (first side portion) 112a, front side portion (second side portion) 112b, left side portion (third side portion) 112c, and protrusions 112d. Some implementations of protrusions 112d can include barbs, ridges, or tapering from greater grip; other implementation materials for protrusions 112d that are a bit compressible for tight fitting with aperture 114f. Also, protrusions 112d are positioned along right side portion (first side portion) 112a, front side portion (second side portion) 112b, and left side portion (third side portion) 112c to allow flangelike structure 112 to partially overlap with display assembly 12 when flangelike structure 112 is coupled with traylike structure 114 for retention of keyboard assembly 14 by keyboard case assembly 100 thereby. The traylike structure 114 can be a single molded piece from a type of plastic or other moldable material or can be constructed from individual pieces. Sizing and shaping of portions of traylike structure 114, such as of rear side portion (first side portion) 114a, right side portion (second side portion) 114b, front side portion (third side portion) 114c, left side portion (fourth side portion) 114d, and baseplate planar structure 114e is conducive with conformably receiving display assembly 12. For instance, wall portions 114a1 are sized and positioned to retain display assembly 12 while being shorter than wall portion 114b1, wall portion 114c1, and wall portion 114d1 to allow keyboard assembly 14 to move according to hinge 16 with respect to display assembly 12. Given the size of wall portions 114a1, edge portion 114a2 is so sized to allow for sizable access to rear of keyboard assembly 14 in case certain models of conventional laptop 10 have various ports or other features that need to be reached while display assembly 12 is being retained by display case assembly 110. Turning to FIG. 5, traylike structure 114 is shown coupled to keyboard assembly 14 with flangelike structure 112 to be engaged therewith and further so engaged as shown in FIG. 6 with portions of top surface (external surface) 112e extending over display assembly 12 to thereby secure display assembly 12 within display case assembly 110.

Figure 7:
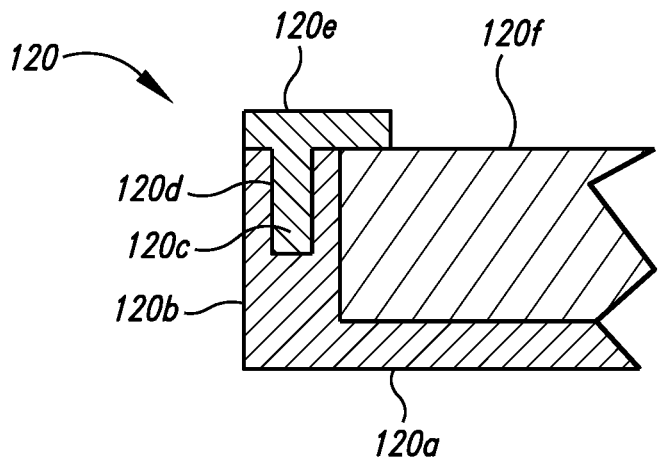
FIG. 7 is a side-elevational view of a first alternative embodiment of a flange engaged with a traylike structure.

Turning to FIG. 7, first fastening assembly 120 is shown to include baseplate planar structure 120a (representing such as baseplate planar structure 104e or baseplate planar structure 114e) wall portion 120b (representing such as expanded wall portion 104b1, wall portion 104c1, wall portion 114b1, wall portion 114c1, or wall portion 114d1), peglike protrusion 120c (representing such as protrusions 102d or protrusions 112d), aperture 120d (representing such as apertures 104f or aperture 114f0, flange portion 120e (representing such as top surface (external surface) 102e or top surface (external surface) 112e), and electronic device portion 120f (representing such as left bevel portion (first bevel portion) 12b, top bevel portion (second bevel portion) 12c, right bevel portion (third bevel portion) 12g, right side portion (first side portion) 14b, or front side portion (second side portion) 14c, or left side portion (third side portion) 14e).

Figure 8:
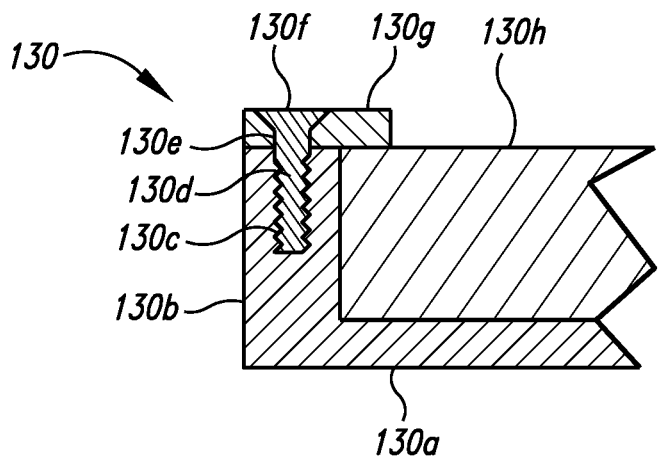
FIG. 8 is a side-elevational view of a second alternative embodiment of a flange engaged with a traylike structure.

Turning to FIG. 8, second fastening assembly 130 is shown to include baseplate planar structure 130a (representing such as baseplate planar structure 104e or baseplate planar structure 114e), wall portion 130b (representing such as expanded wall portion 104b1, wall portion 104c1, wall portion 114b1, wall portion 114c1, or wall portion 114d1), threaded aperture 130c, (representing an alternative to such as apertures 104f or aperture 114f0, threaded fastener 130d (representing an alternative to such as protrusions 102d or protrusions 112d), flange aperture 130e, fastener head 130f, flange portion 130g (representing an alternative to such as top surface (external surface) 102e or top surface (external surface) 112e), and electronic device portion 130h (representing such as left bevel portion (first bevel portion) 12b, top bevel portion (second bevel portion) 12c, right bevel portion (third bevel portion) 12g, right side portion (first side portion) 14b, or front side portion (second side portion) 14c, or left side portion (third side portion) 14e).

Figure 9:
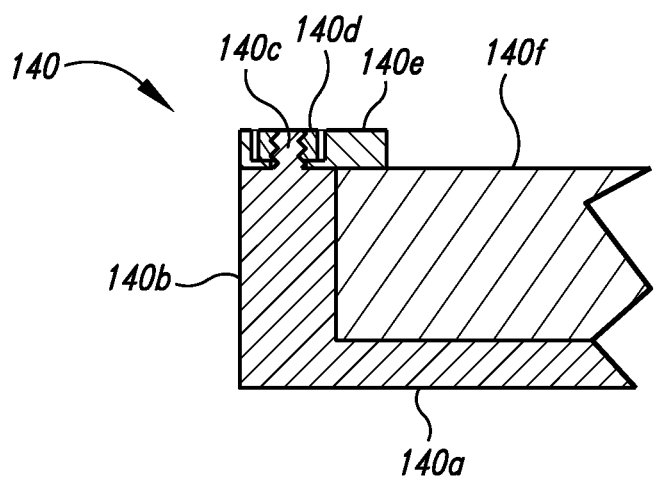
FIG. 9 is a side-elevational view of a third alternative embodiment of a flange engaged with a traylike structure.

Turning to FIG. 9, third fastening assembly 140 is shown to include baseplate planar structure 140a (representing such as baseplate planar structure 104e or baseplate planar structure 114e), wall portion 140b (representing such as expanded wall portion 104b1, wall portion 104c1, wall portion 114b1, wall portion 114c1, or wall portion 114d1), threaded projection 140c (representing an alternative to such as protrusions 102d or protrusions 112d), threaded nut 140d, and flange 140e (representing an alternative to such as top surface (external surface) 102e or top surface (external surface) 112e), electronic device portion 140f (representing such as left bevel portion (first bevel portion) 12b, top bevel portion (second bevel portion) 12c, right bevel portion (third bevel portion) 12g, right side portion (first side portion) 14b, or front side portion (second side portion) 14c, or left side portion (third side portion) 14e).

Figure 10:
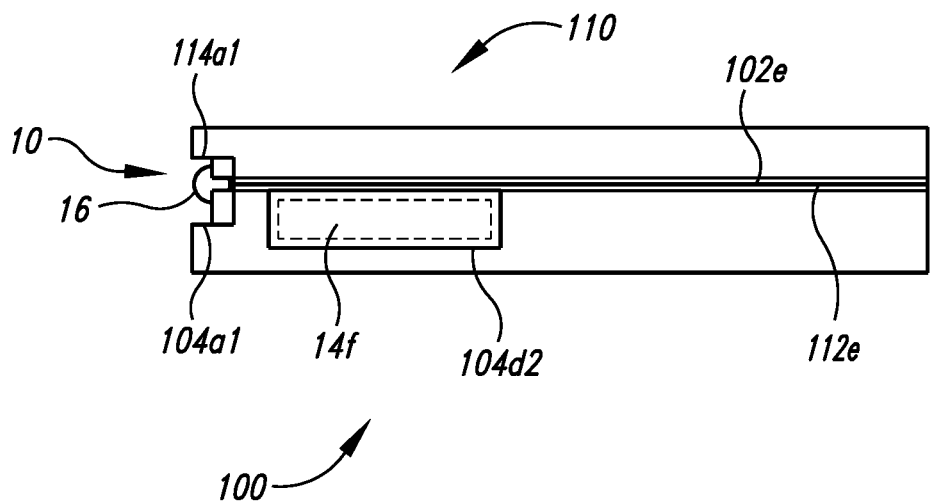
FIG. 10 is a side-elevational view of the case assembly for the first computer laptop embodiment in a closed position containing the conventional computer laptop.
Figure 11:
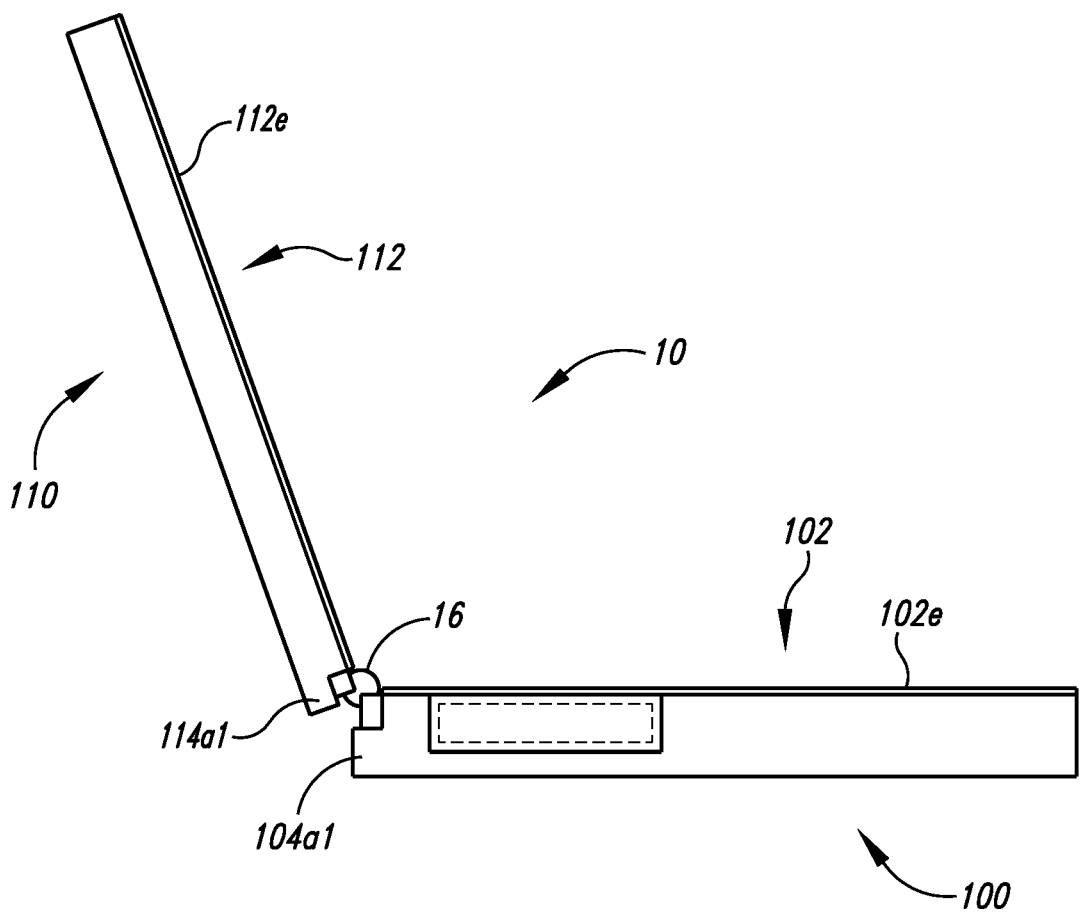
FIG. 11 is a side-elevational view of the case assembly for the first computer laptop case embodiment in an open position containing the conventional computer laptop.

Turning to FIG. 10, conventional laptop 10 is shown in closed position with keyboard case assembly 100 and display case assembly 110 engaged therewith. Turning to FIG. 11, conventional laptop 10 is shown in open position with keyboard case assembly 100 and display case assembly 110 engaged therewith to so contain display assembly 12 therein.

Figure 12:
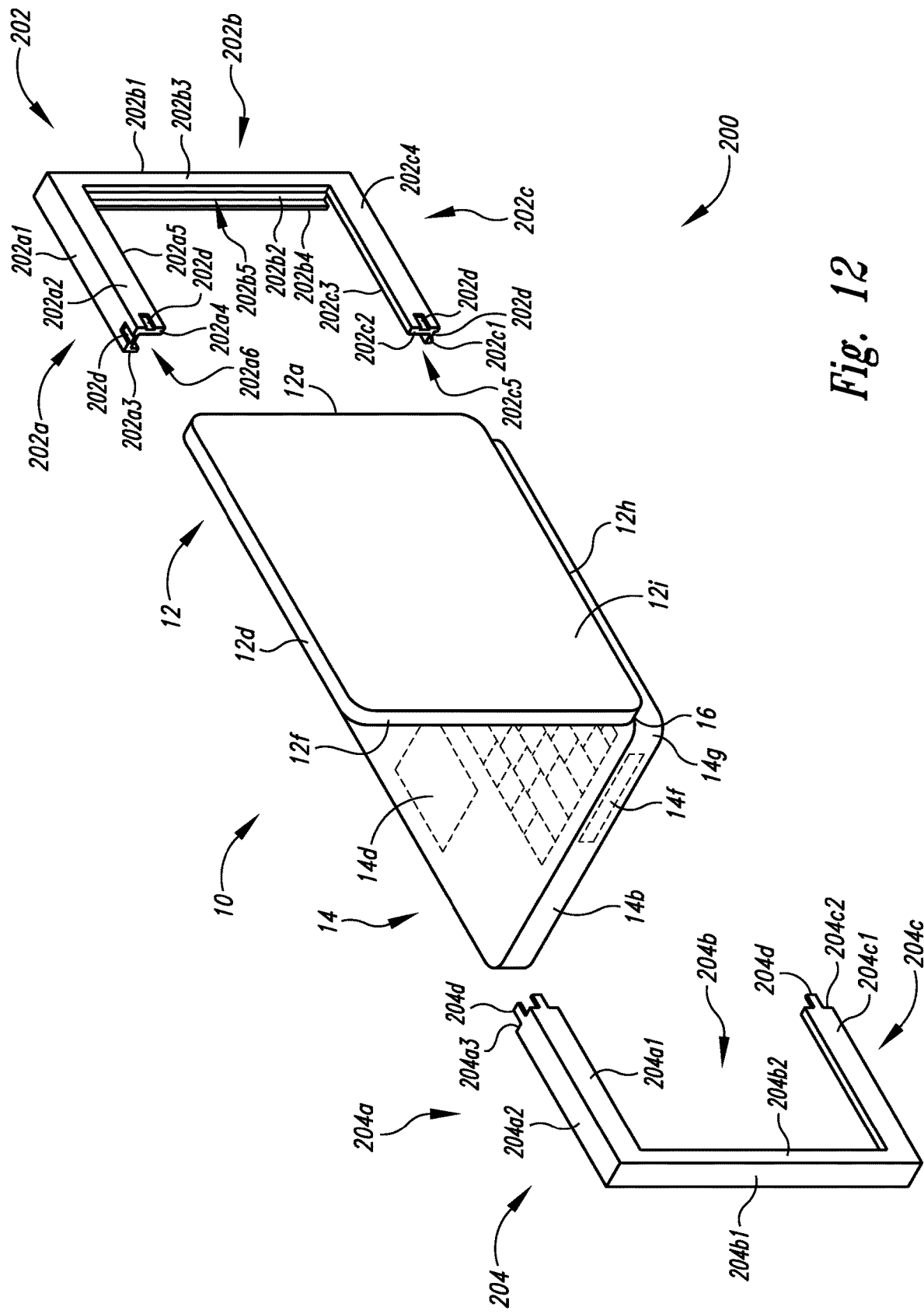
FIG. 12 is a rear perspective exploded view of a display case assembly for a second computer laptop case embodiment along with the computer laptop.
Figure 13:
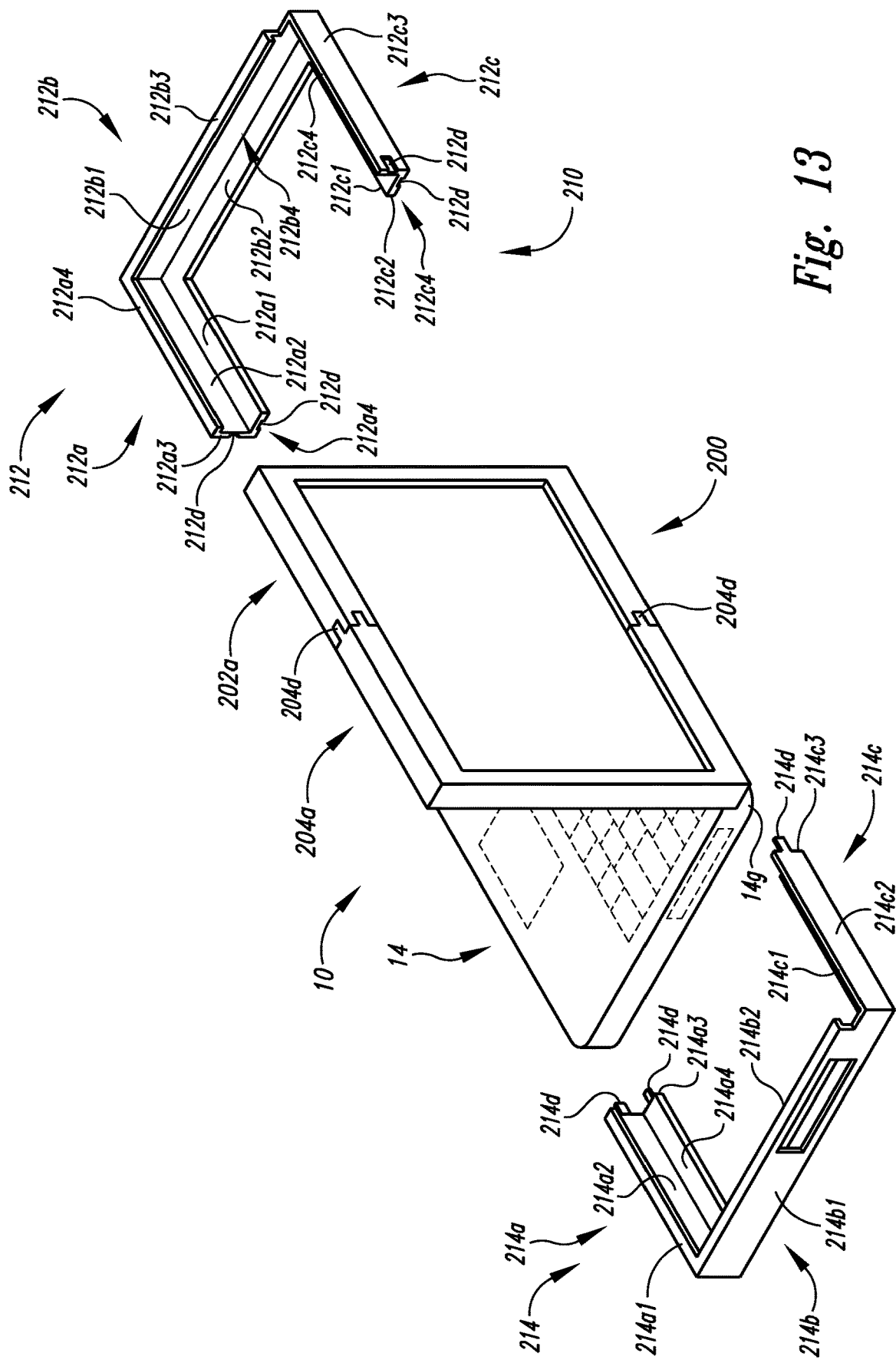
FIG. 13 is a rear perspective exploded view of a keyboard case assembly for the second computer laptop case embodiment along with the display of the conventional computer laptop being contained by the display case assembly of second computer laptop case embodiment.
Figure 14:
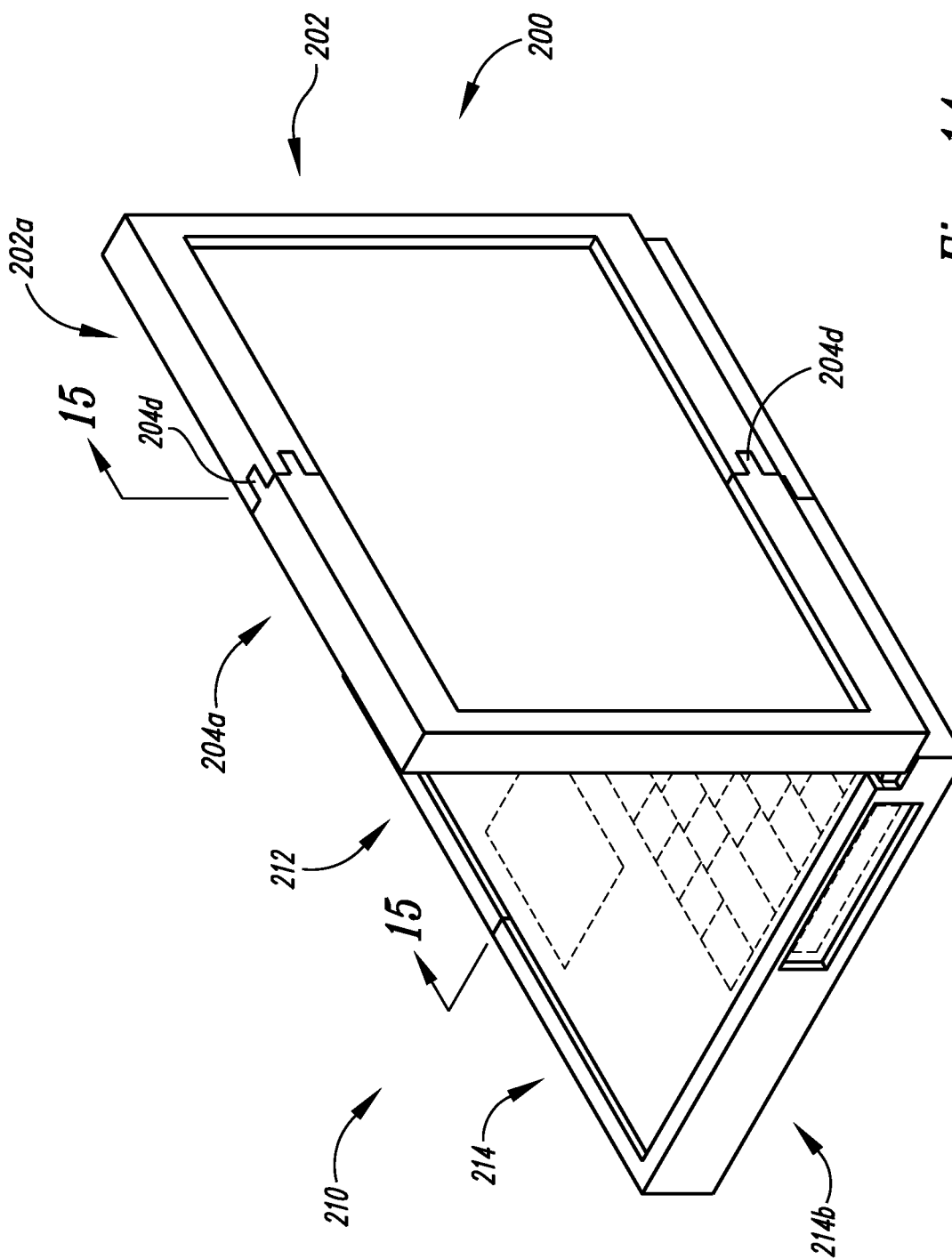
FIG. 14 is a rear perspective view of the display case assembly and the keyboard case assembly for the second computer laptop case embodiment containing the conventional laptop computer.
Figure 15:
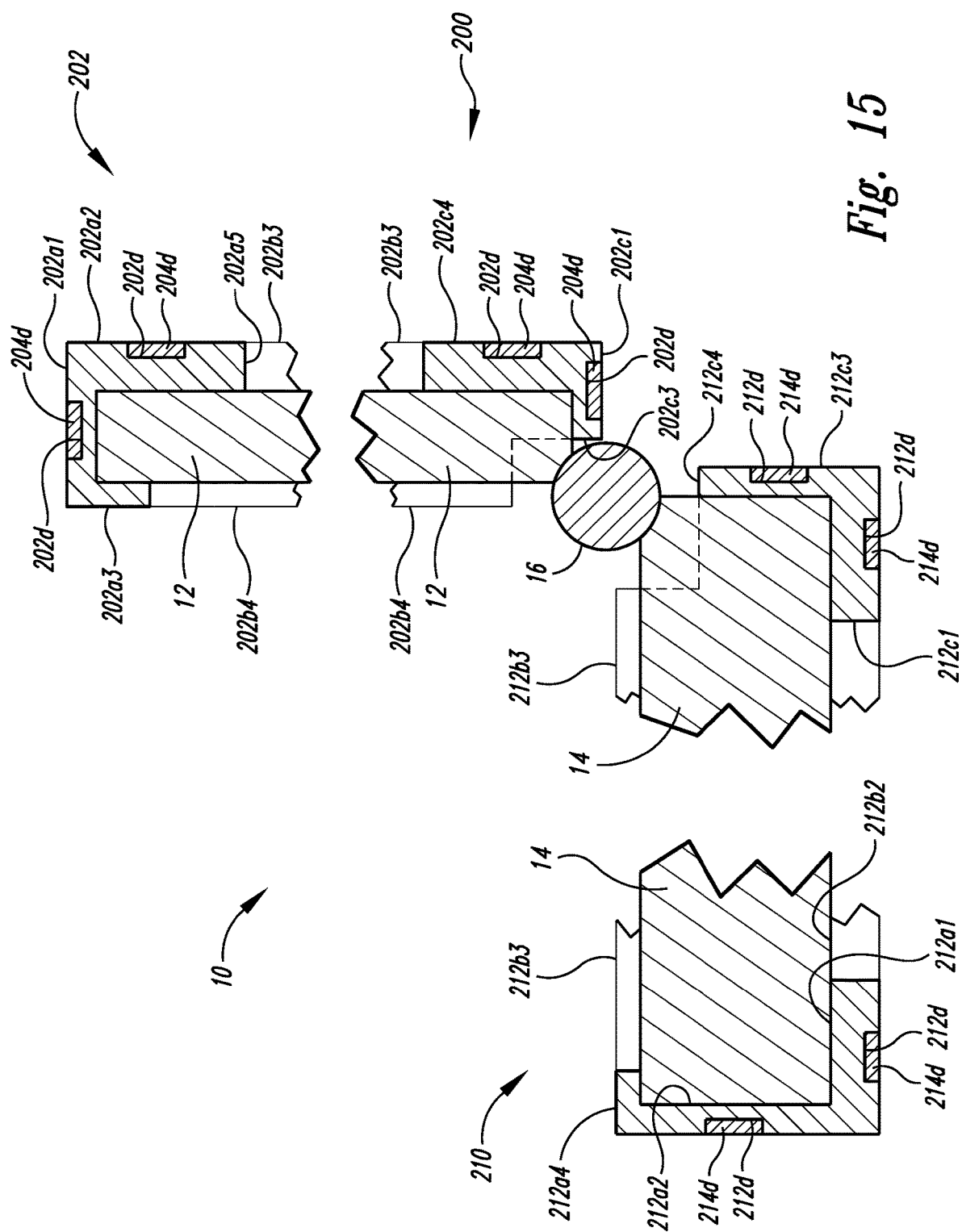
FIG. 15 is a cross-sectional view of the display case assembly and the keyboard case assembly for the second computer laptop case embodiment taken along the 15-15 cutline of FIG. 14 containing the conventional laptop computer.

Turning to FIG. 12, shown in rear perspective exploded view is conventional laptop 10 having display assembly 12 positioned for receiving display case assembly 200 for engagement therewith. Having two sections, display case assembly 200 includes first frame portion 202 and second frame portion 204. The first frame portion 202 includes left side portion (first side portion) 202a with base wall portion 202a1, first wall portion 202a2, second wall portion 202a3, end portion 202a4, edge portion 202a5, and first channel portion 202a6 so formed thereby; center side portion (second side portion) 202b with base wall portion 202b1, first wall portion 202b2, second wall portion 202b3, edge portion 202b4, and second channel portion 202b5 so formed thereby; right side portion (third side portion) 202c with base wall portion 202c1, end portion 202c2, edge portion 202c3, first wall portion 202c4, third channel portion 202c5 so formed thereby, and end slots 202d on end portion 202a4 and end portion 202c2. The second frame portion 204 includes left side portion (first side portion) 204a with first wall portion 204a1, base wall portion 204a2, and end portion 204a3; center side portion (second side portion) 204b with base wall portion 204b1, and first wall portion 204b2; right side portion (third side portion) 204c with first wall portion 204c1, and end portion 204c2; and end protrusions 204d on end portion 204a3 and end portion 204c2. The end slots 202d of first frame portion 202 are sized, shaped, and positioned for engagement with end protrusions 204d end protrusions 204d of second frame portion 204 can also be referred to as tongue-and-groove connectors. The end slots 202d of first frame portion 202 are sized, shaped, and positioned for engagement with end protrusions 204d of second frame portion 204 to couple first frame portion 202 with second frame portion 204. The second wall portion 202a3 and edge portion 202a5 extend from base wall portion 202a1 to form a channel to engage with a portion of top side portion (second side portion) 12d. The first wall portion 202b2 and second wall portion 202b3 extend from base wall portion 202b1 to form a channel to engage with right side portion (third side portion) 12f. The first wall portion 202c4 extends from base wall portion 202c1 to form a channel to engage with bottom side portion (fourth side portion) 12h. The first frame portion 202 can be a single molded piece from a type of plastic or other moldable material or can be constructed from individual pieces. Similar to first frame portion 202, second frame portion 204 has channels that engage with portions of left side portion (first side portion) 12a, top side portion (second side portion) 12d, right side portion (third side portion) 12f, and bottom side portion (fourth side portion) 12h. The second frame portion 204 can be a single molded piece from a type of plastic or other moldable material or can be constructed from individual pieces Turning to FIG. 13, shown in rear perspective exploded view is conventional laptop 10 having keyboard assembly 14 positioned for receiving keyboard case assembly 210 for engagement therewith. Having two sections, keyboard case assembly 210 includes first frame portion 212 and second frame portion 214. The first frame portion 212 includes left side portion (first side portion) 212a with first wall portion 212a1, base wall portion 212a2, end portion 212a3, and first channel portion 212a4 so formed thereby; center side portion (second side portion) 212b with base wall portion 212b1, first wall portion 212b2, second wall portion 212b3, and second channel portion 212b4 so formed thereby; right side portion (third side portion) 212c with first wall portion 212c1, end portion 212c2, base wall portion 212c3, and third channel portion 212c4 so formed thereby; and end slots 212d on end portion 212a3 and end portion 212c2. The first frame portion 212 can be a single molded piece from a type of plastic or other moldable material or can be constructed from individual pieces. The second frame portion 214 includes left side portion (first side portion) 214a with first wall portion 214a1, base wall portion 214a2, end portion 214a3, and second wall portion 214a4; center side portion (second side portion) 214b with base wall portion 214b1, first wall portion 214b2, and component access aperture 214b3; right side portion (third side portion) 214c with first wall portion 214c1, base wall portion 214c2, and end portion 214c3; and end protrusions 214d on end portion 214a3 and end portion 214c3. The end slots 212d of first frame portion 212 are sized, shaped, and positioned for engagement with end protrusions 214d of second frame portion 214 to couple first frame portion 212 with second frame portion 214. The first wall portion 212a1 and first channel portion 212a4 extend from base wall portion 212a2 to form a channel to engage with a portion of front side portion (second side portion) 14c. The first wall portion 212b2 and second wall portion 212b3 extend from base wall portion 212b1 to form a channel to engage with left side portion (third side portion) 14e. The first wall portion 212c1 extends from base wall portion 212c3 to form a channel to engage with rear side portion (second side portion) 14g. Similar to first frame portion 212, second frame portion 214 has channels that engage with portions of right side portion (first side portion) 14b, front side portion (second side portion) 14c, and rear side portion (second side portion) 14g. The second frame portion 214 can be a single molded piece from a type of plastic or other moldable material or can be constructed from individual pieces Turning to FIGS. 14 and 15, both display case assembly 200 and keyboard case assembly 210 are shown engaged with display assembly 12 and keyboard assembly 14 of the conventional laptop 10, respectively, to so contain display assembly 12 and keyboard assembly 14 therein, respectively.

Figure 16:
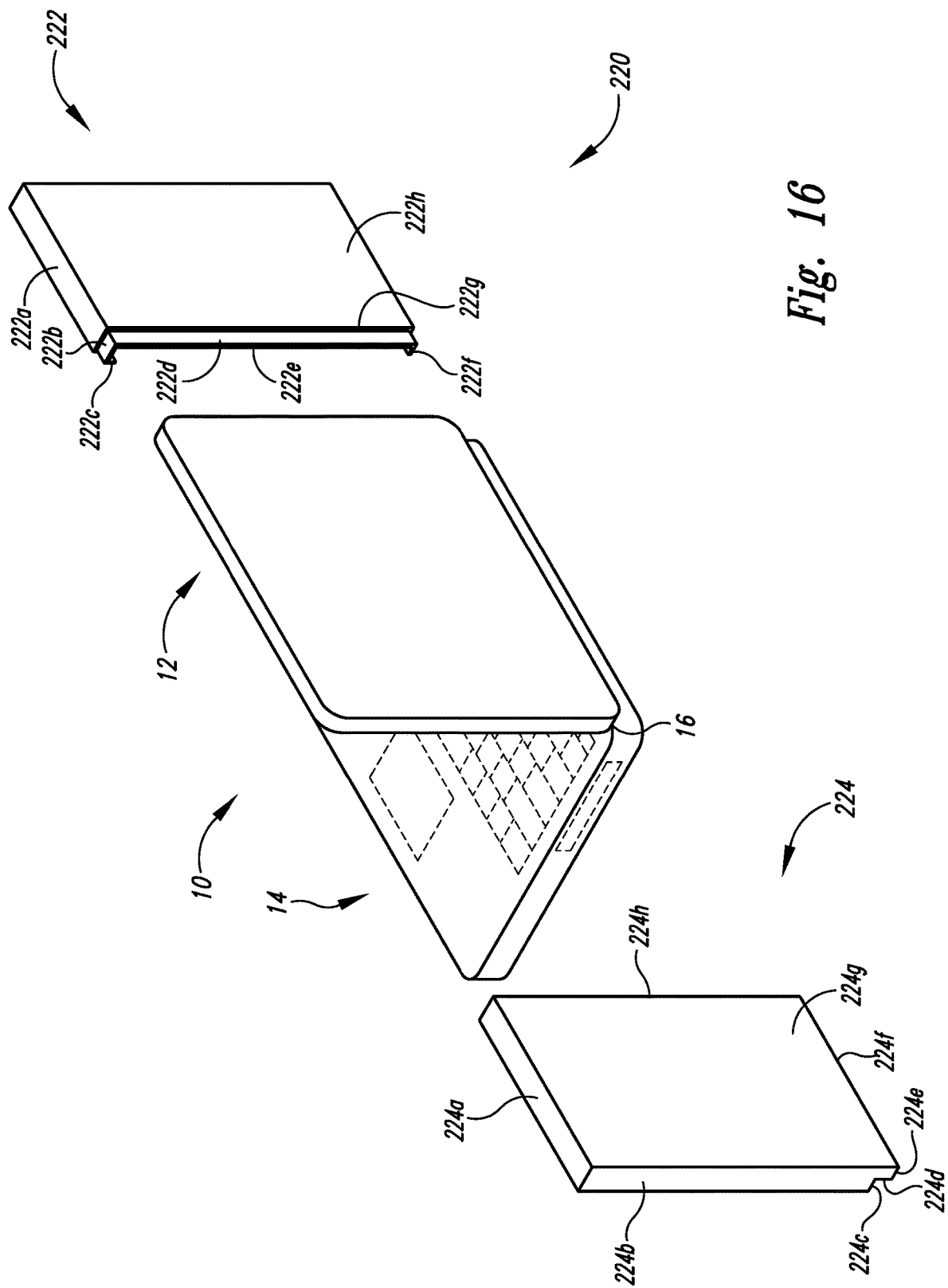
FIG. 16 is a rear perspective exploded view of a display case assembly for a third computer laptop case embodiment along with the conventional laptop computer.
Figure 17:
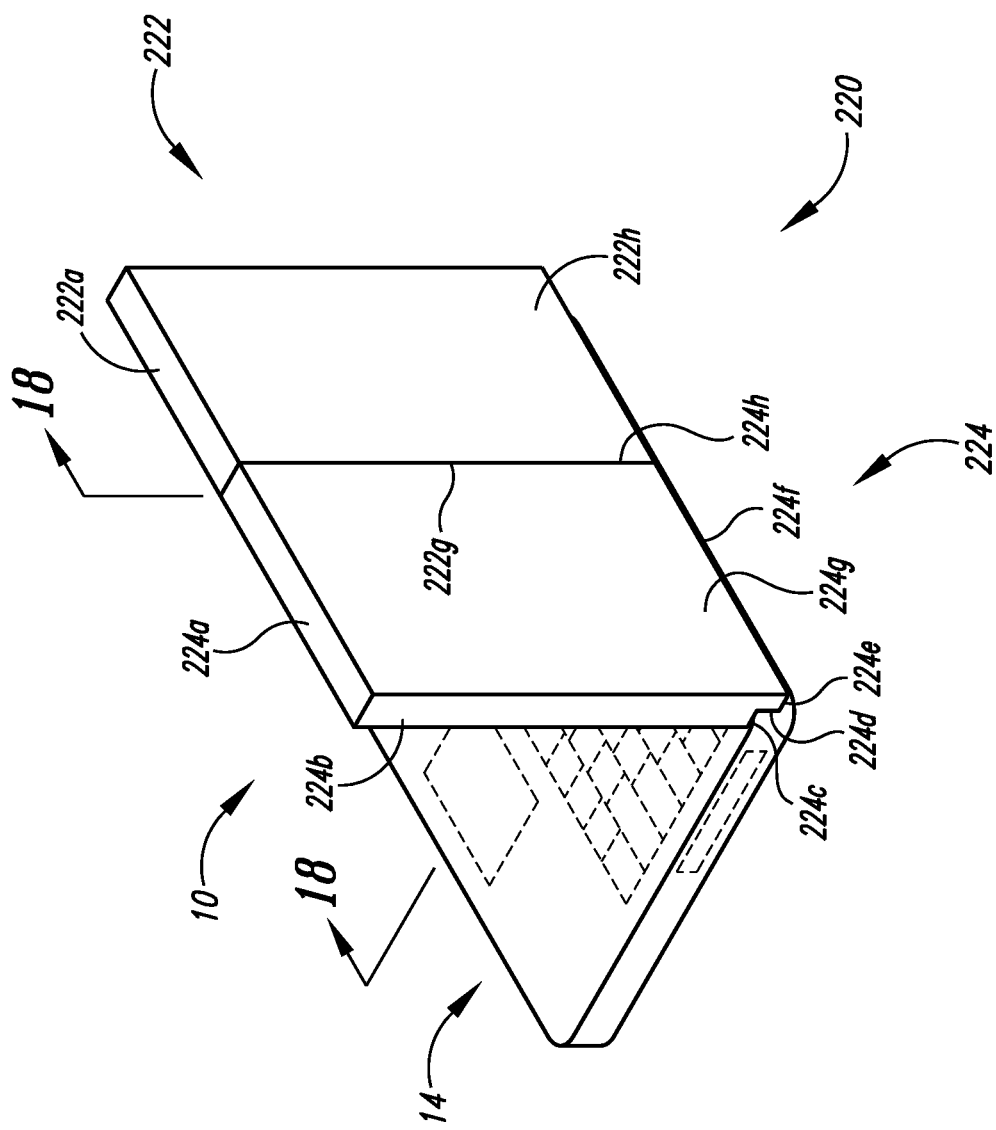
FIG. 17 is a rear perspective view of the display case assembly for the third computer laptop case embodiment containing the conventional laptop computer.
Figure 18:
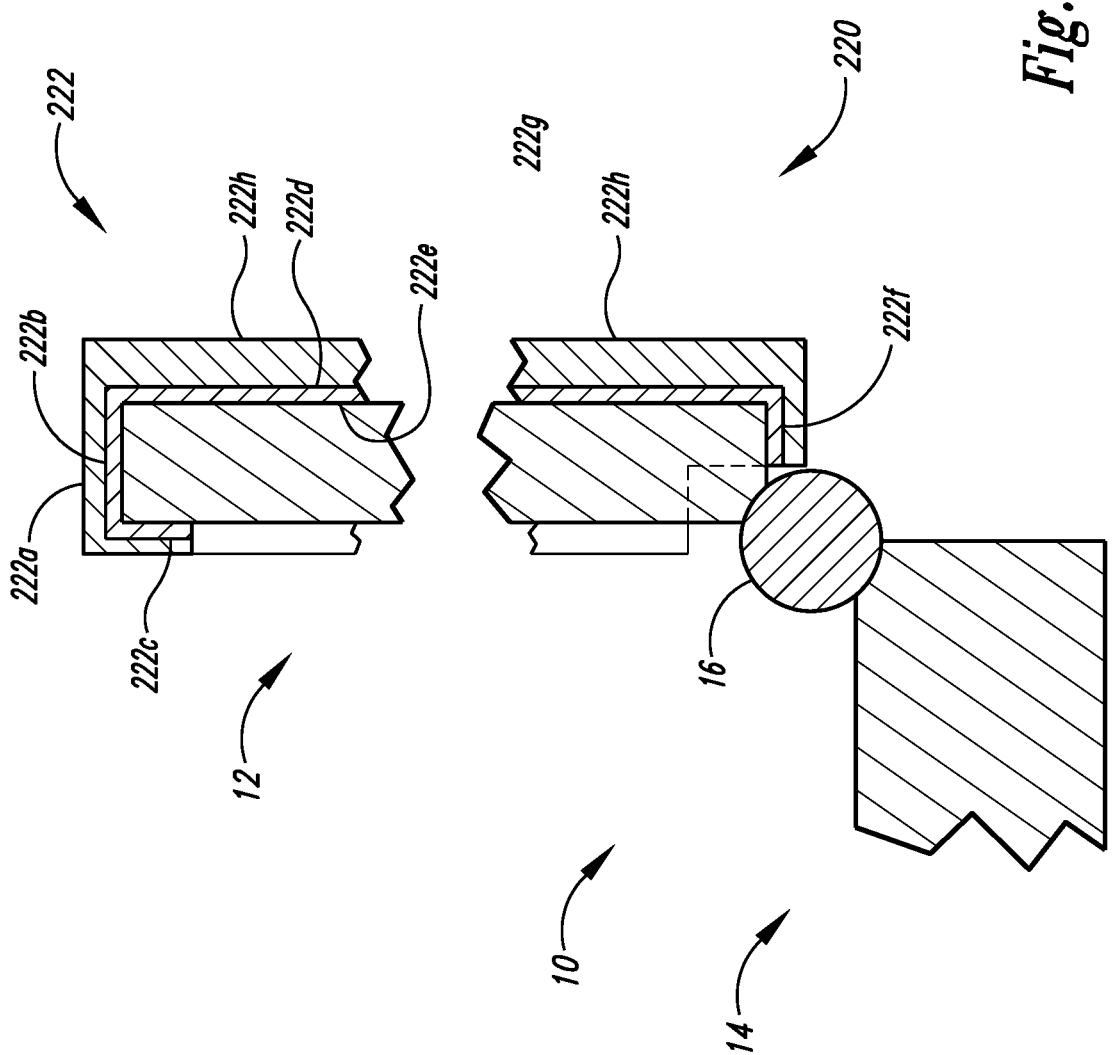
FIG. 18 is a cross-sectional view taken along the 18-18 cutline of FIG. 17 of the display case assembly for the third computer laptop case embodiment containing the conventional laptop computer.
Figure 19:
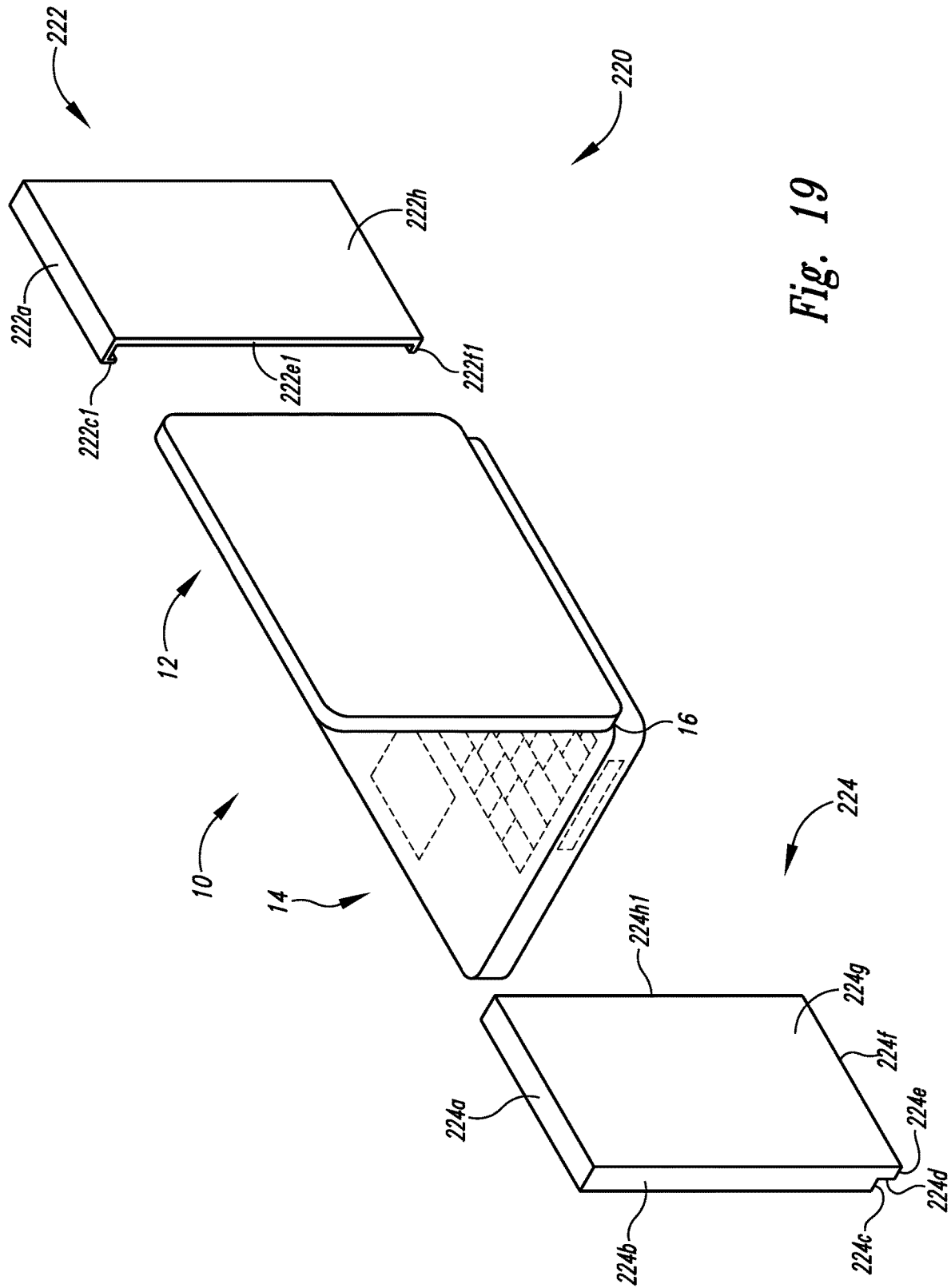
FIG. 19 is a rear perspective view of the display case assembly for another implementation of the third computer laptop case embodiment containing the conventional laptop computer.

Turning to FIG. 16, display case assembly 220 includes first case portion 222 and second case portion 224 that are coupled in an alternative manner to that used for display case assembly 200. The first case portion 222 and second case portion 224 can each be a single molded piece from a type of plastic or other moldable material or can be constructed from individual pieces. The first case portion 222 includes left exterior side portion (first side portion) 222a, left inner base wall portion (first base wall portion) 222b, left inner wall portion (first wall portion) 222c, central inner wall portion (first central portion) 222d, central inner edge 222e, right inner wall portion (second wall portion) 222f, central exterior edge 222g, and posterior wall portion 222h. The second case portion 224 includes left exterior side portion (first side portion) 224a, rear exterior side portion (first side portion) 224b, right exterior lower wall 224c, right exterior base 224d, right exterior upper wall 224e, right exterior edge 224f, posterior wall portion 224g, and central edge 224h. The components of first case portion 222 and second case portion 224 form channels for engagement with display assembly 12 similar to what is found with display case assembly 200. The central exterior edge 222g of display case assembly 220 is magnetic which engages with central edge 224h of second case portion 224 which is also magnetic of opposite pole. In other embodiments first case portion 222 and second case portion 224 are friction fitted together. Turning to FIGS. 17 and 18, conventional laptop 10 is shown in open position with first case portion 222 and second case portion 224 engaged therewith and with each other. Turning to FIG. 19, shown is first case portion 222 having left edge portion 222c1, central edge portion 222e1, and right edge portion 222f1 and second case portion 224 with central edge portion 224h1 that meet each other without overlap when first case portion 222 and second case portion 224 are coupled together such as with use of magnetic materials and ferromagnetic materials placed along such edge portions.

Figure 20:
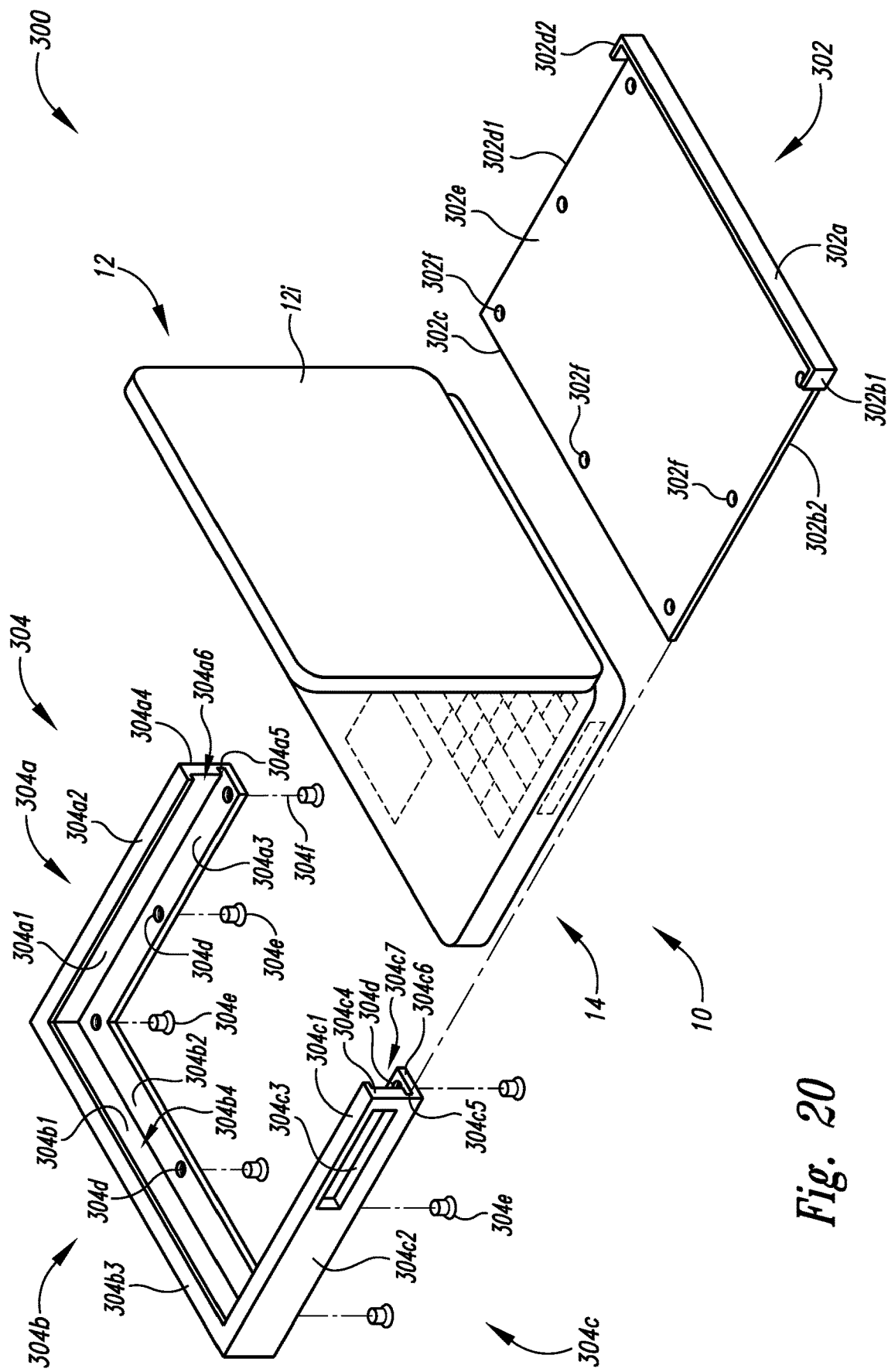
FIG. 20 is a rear perspective exploded view of a keyboard case assembly for a fourth computer laptop case embodiment along with the conventional laptop computer.

Turning to FIG. 20, shown in front exploded perspective view is conventional laptop 10 having keyboard assembly 14 positioned for receiving keyboard case assembly 300 for engagement therewith. Having two sections, keyboard case assembly 300 includes base structure 302 and frame structure 304. The base structure 302 and frame structure 304 can each be a single molded piece from a type of plastic or other moldable material or can be constructed from individual pieces. The base structure 302 includes rear wall portion (first wall portion) 302a, right wall portion (second wall portion) 302b1, right edge portion (first edge portion) 302b2, front edge portion (second edge portion) 302c, left edge portion (third edge portion) 302d1, left wall portion (third wall portion) 302d2, baseplate planar portion 302e, and apertures 302f. The rear wall portion (first wall portion) 302a, right wall portion (second wall portion) 302b1, and left wall portion (third wall portion) 302d2 are sized, shaped, and positioned to retain rear side portion (second side portion) 14g and portions of right side portion (first side portion) 14b and left side portion (third side portion) 14e as keyboard assembly 14 is being contained by keyboard case assembly 300.

The frame structure 304 includes left side portion (first side portion) 304a with base wall portion 304a1, first wall portion 304a2, second wall portion 304a3, and slot 304a5, and first channel portion 304a6 so formed thereby; center side portion (second side portion) 304b with base wall portion 304b1, first wall portion 304b2, second wall portion 304b3, and second channel portion 304b4 so formed thereby; right side portion (third side portion) 304c with first wall portion 304c1, base wall portion 304c2, component access aperture 304c3, end 304c4, slot 304c5, second wall portion 304c6, and third channel portion 304c7 so formed thereby; apertures 304d on second wall portion 304a3, first wall portion 304b2, and second wall portion 304c6. The slot 304a5 and slot 304c5 are sized, shaped, and positioned to receive baseplate planar portion 302e with each of the apertures 302f aligned with a corresponding one of the apertures 304d to allow engagement of fasteners 304e with apertures 302f and apertures 304d as keyboard assembly 14 is being contained by keyboard case assembly 300. The first wall portion 304a2 and second wall portion 304a3 extend from base wall portion 304a1, first wall portion 304b2 and second wall portion 304b3 extend from base wall portion 304b1, and first wall portion 304c1 and second wall portion 304c6 extend from base wall portion 304c2 to form three channels to engage left side portion (third side portion) 14e, front side portion (second side portion) 14c, and right side portion (first side portion) 14b, of keyboard assembly 14, respectively, as keyboard assembly 14 is being contained by keyboard case assembly 300.

Figure 21:
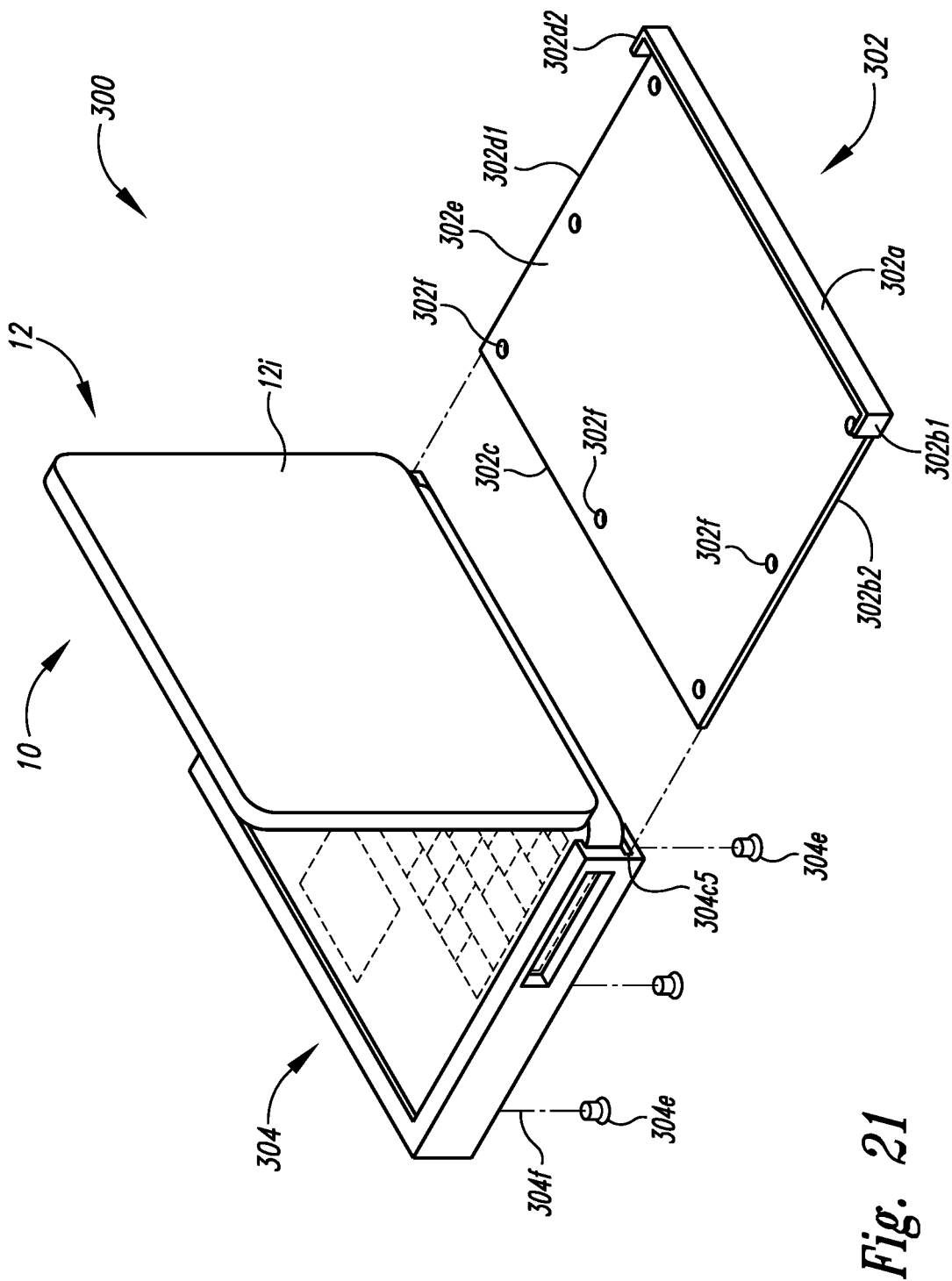
FIG. 21 is a rear perspective exploded view of the keyboard case assembly for the fourth computer laptop case embodiment along with the conventional laptop computer.
Figure 22:
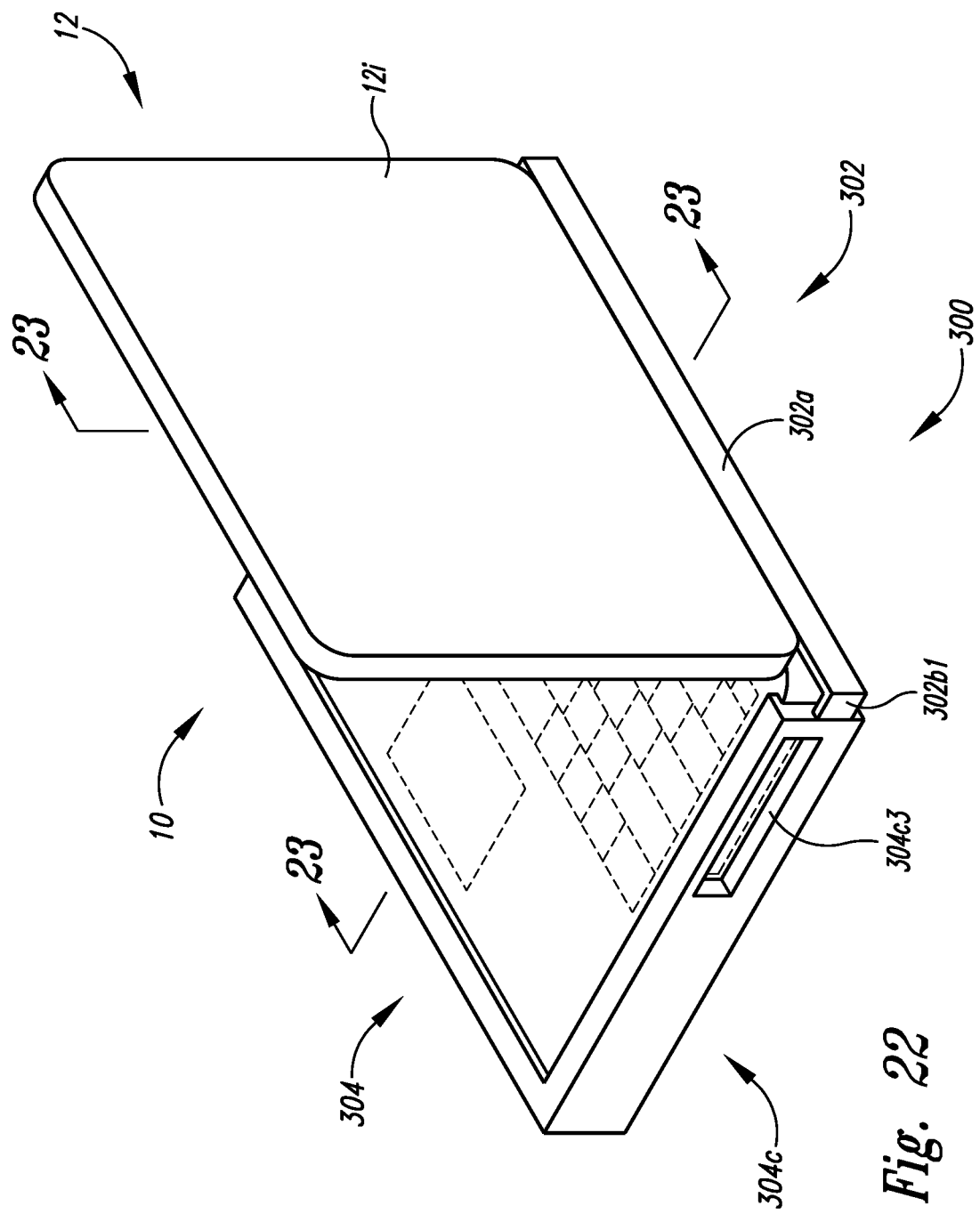
FIG. 22 is a rear perspective exploded view of the keyboard case assembly for the fourth computer laptop case embodiment containing the conventional laptop computer.
Figure 23:
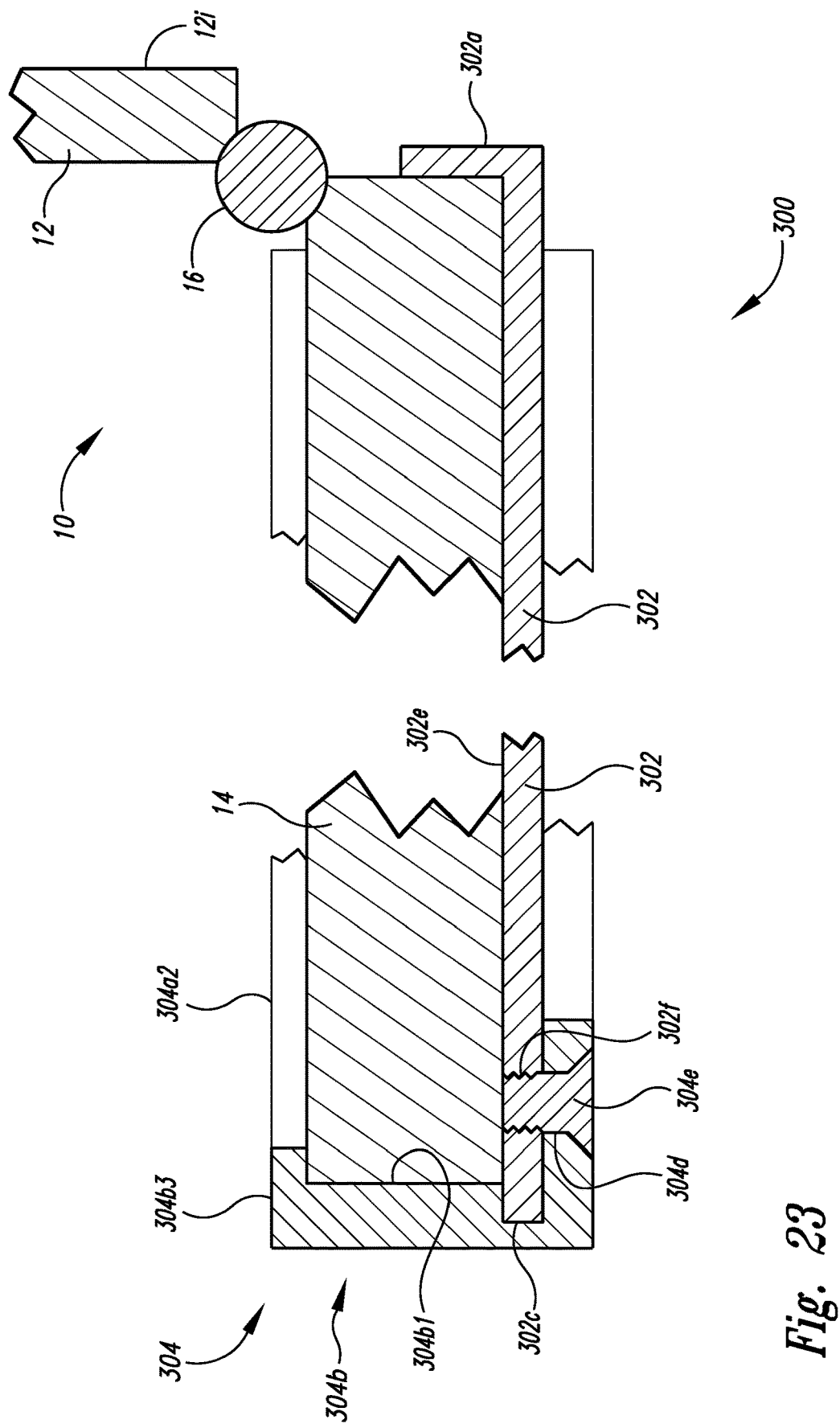
FIG. 23 is a cross-sectional view taken along the cutline 23-23 of FIG. 22 of the keyboard case assembly for the fourth computer laptop case embodiment containing the conventional laptop computer.

Turning to FIG. 21, frame structure 304 is shown coupled to keyboard assembly 14 with base structure 302 to be engaged therewith and further so engaged as shown in FIGS. 21 and 22. Furthermore, in FIG. 23 apertures 302f and fasteners 304e are shown as threaded. In alternative implementations allow for non-threaded engagement such as with fasteners 304e composed of material such as plastic allowing compression to friction fit fasteners 304e with apertures 304d. Other implementations include screws, bolts, plugs, plugs with ribs, barbs, ridges, compressibility, or tapering of fasteners 304e to increase grip.

Turning to FIG. 24, shown in front exploded perspective view is conventional laptop 10 having keyboard assembly 14 positioned to be received by traylike structure 306 for engagement therewith. The traylike structure 306 can be a single molded piece from a type of plastic or other moldable material or can be constructed from individual pieces. As depicted, traylike structure 306 includes rear side portion (first side portion) 306a, wall portions 306a1, edge portion 306a2, right side portion (second side portion) 306b, expanded wall portion 306b1, recessed wall portion 306b2, front side portion (third side portion) 306c, wall portion 306c1, left side portion (fourth side portion) 306d, expanded wall portion 306d1, recessed wall portion 306d2, baseplate planar structure 306e, and apertures 306f being positioned along baseplate planar structure 306e to receive fasteners 306g.

Figure 25:
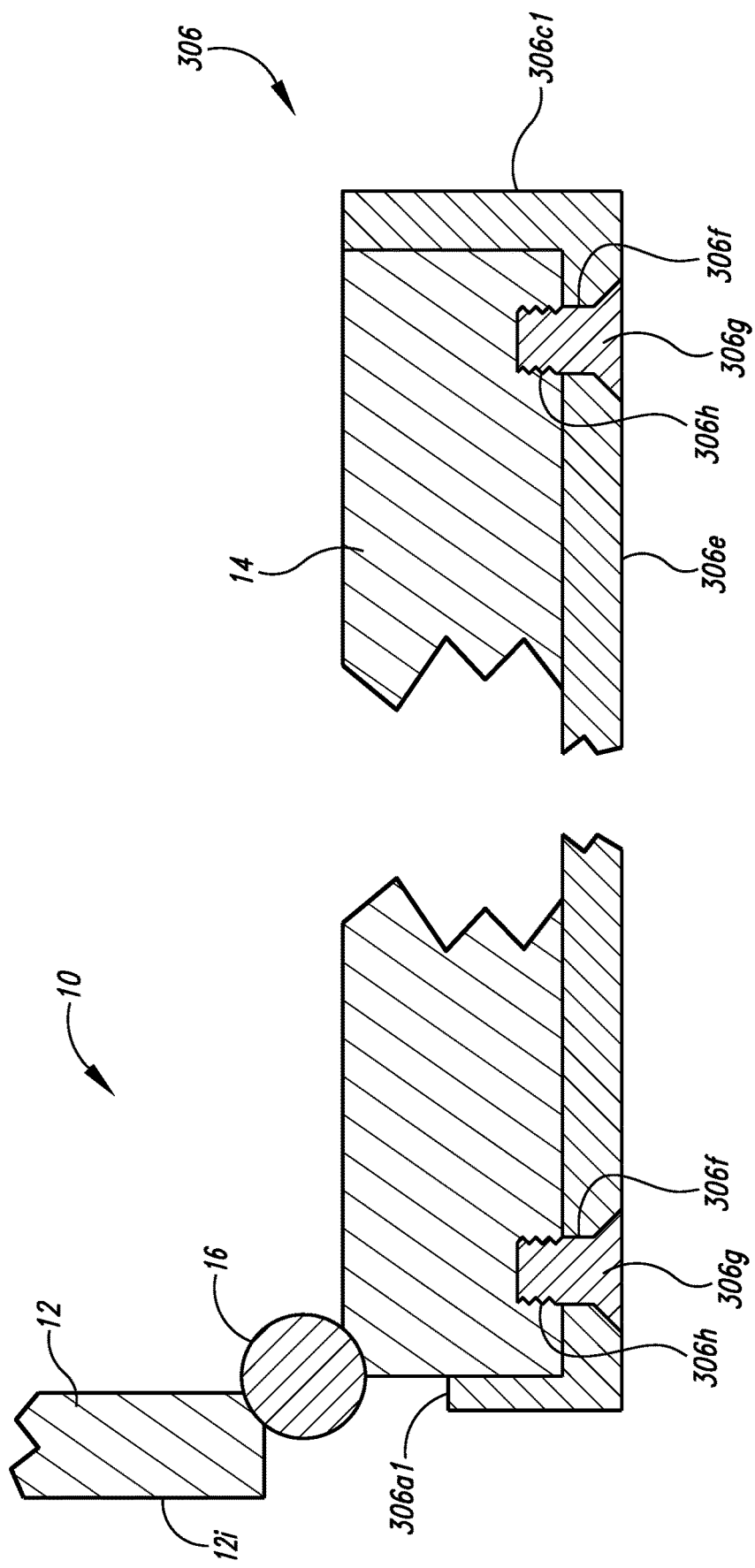
FIG. 25 is a cross-sectional view taken along the cutline 25-25 of Figure for the fifth computer laptop case embodiment along with the conventional laptop computer.

Sizing and shaping of portions of traylike structure 306, such as of rear side portion (first side portion) 306a, right side portion (second side portion) 306b, front side portion (third side portion) 306c, left side portion (fourth side portion) 306d, and baseplate planar structure 306e is conducive with conformably receiving keyboard assembly 14. For instance, wall portions 306a1 is sized and positioned to retain keyboard assembly 14 while being shorter than expanded wall portion 306b1, wall portion 306c1, and expanded wall portion 306d1 to allow display assembly 12 to move according to hinge 16 with respect to keyboard assembly 14. Given the size of wall portions 306a1, edge portion 306a2 is so sized to allow for sizable access to rear of keyboard assembly 14 in case certain models of conventional laptop 10 have various ports or other features that need to be reached while keyboard assembly 14 is being retained by traylike structure 306. Similarly, recessed wall portion 306b2, and recessed wall portion 306d2 are shortened in height to allow access to media ports including media slot 14f of keyboard assembly 14. Turning to FIG. 25, traylike structure 306 is shown coupled to keyboard assembly 14 through use of fasteners 306g being threaded into device apertures 306h of keyboard assembly 14 to thereby secure keyboard assembly 14 with traylike structure 306.

Figure 26:
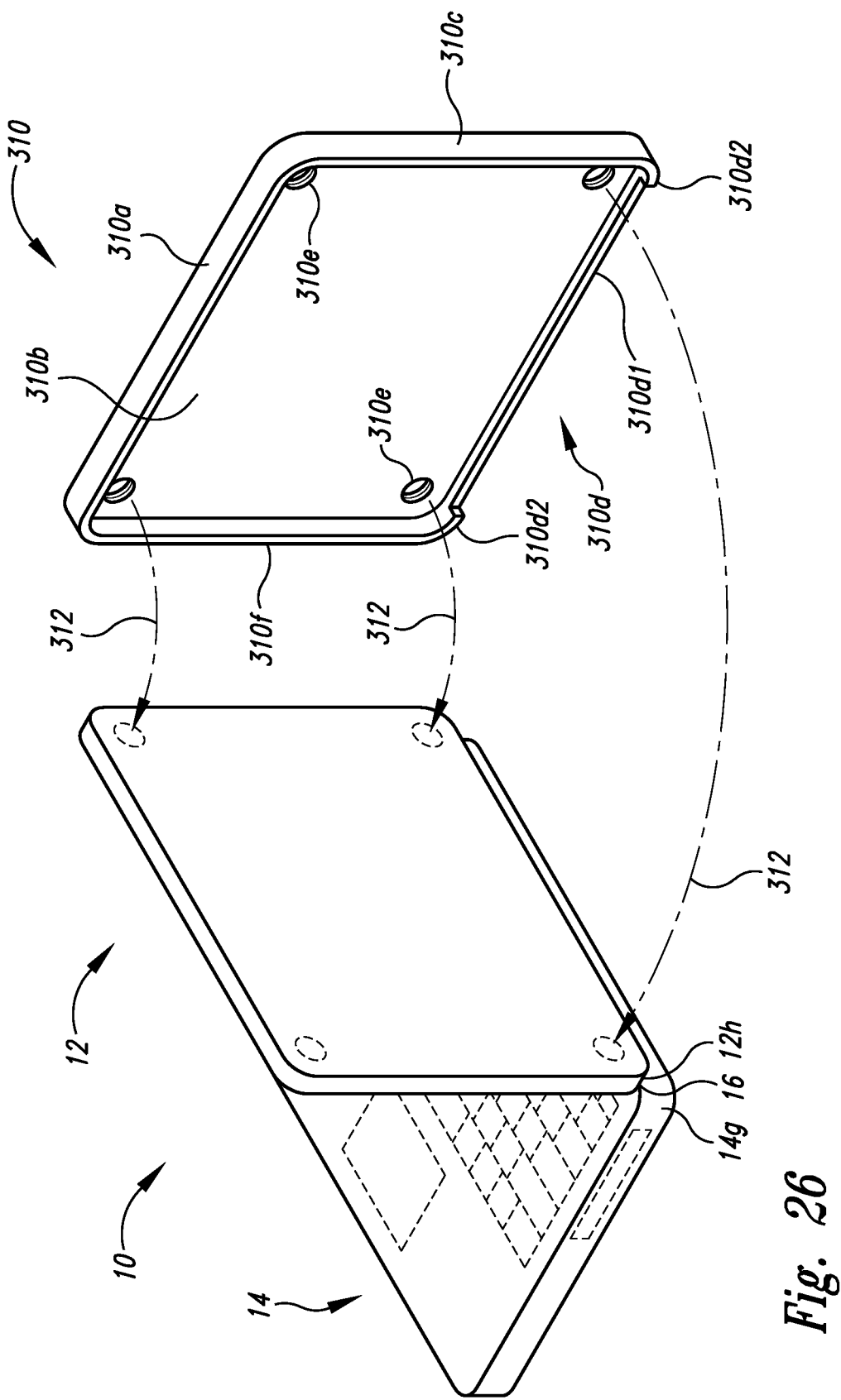
FIG. 26 is a rear perspective view of a display case assembly for a sixth computer laptop case embodiment along with the conventional laptop computer.

Turning to FIG. 26, shown in front perspective view is conventional laptop 10 having display assembly 12 positioned for receiving display case traylike assembly 310 for engagement therewith. The display case traylike assembly 310 can be a single molded piece from a type of plastic or other moldable material or can be constructed from individual pieces. The display case traylike assembly 310 includes top wall portion (first wall portion) 310a, baseplate planar portion inner surface 310b, right wall portion (second wall portion) 310c, lower wall portion (third wall portion) 310d, shortened wall portion 310d1, raised wall portions 310d2. apertures 310e, left wall portion (fourth wall portion) 310f, all shaped, sized and positioned for retaining as display assembly 12 is being contained by display case traylike assembly 310 with illustrative path 312 showing where apertures 310e are positioned on display assembly 12. Height of shortened wall portion 310d1 is sized to accommodate movement of display assembly 12 about hinge 16.

Figure 27:
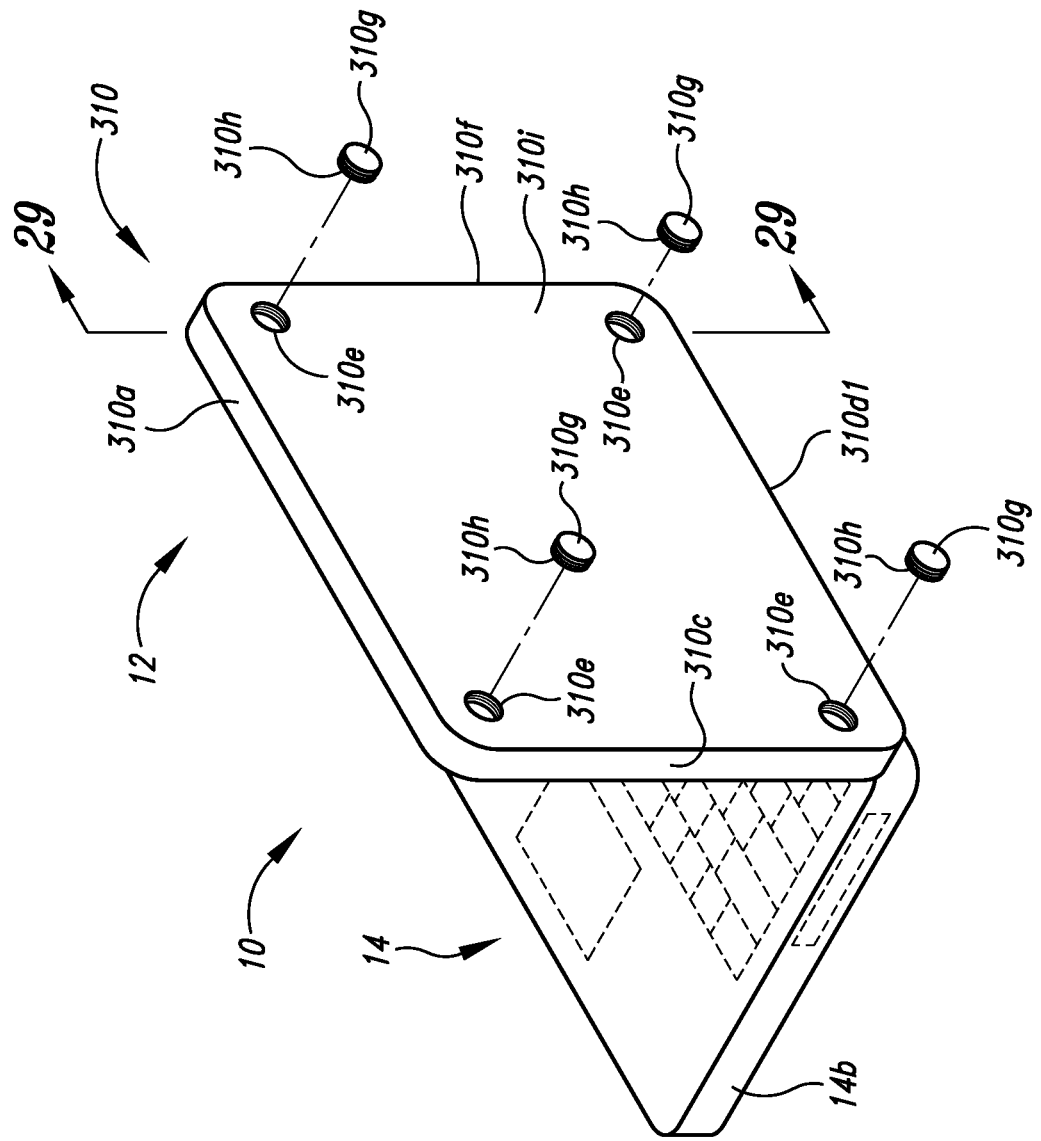
FIG. 27 is a rear perspective exploded view of the display case assembly for the sixth computer laptop case embodiment along with the conventional laptop computer.
Figure 29:
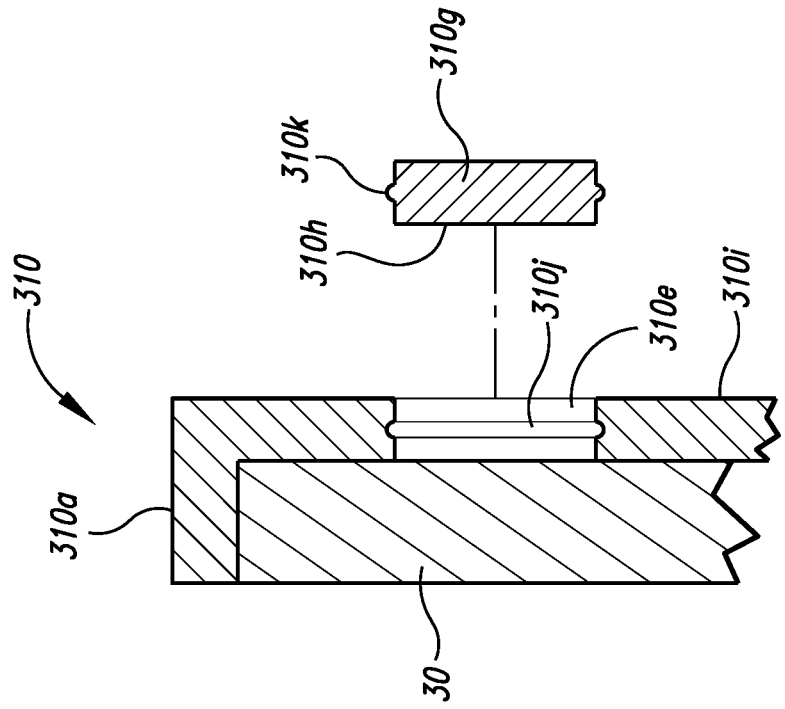
FIG. 29 is a cross-sectional magnified view of an alternative case assembly for a seventh computer laptop case embodiment.
Figure 28:
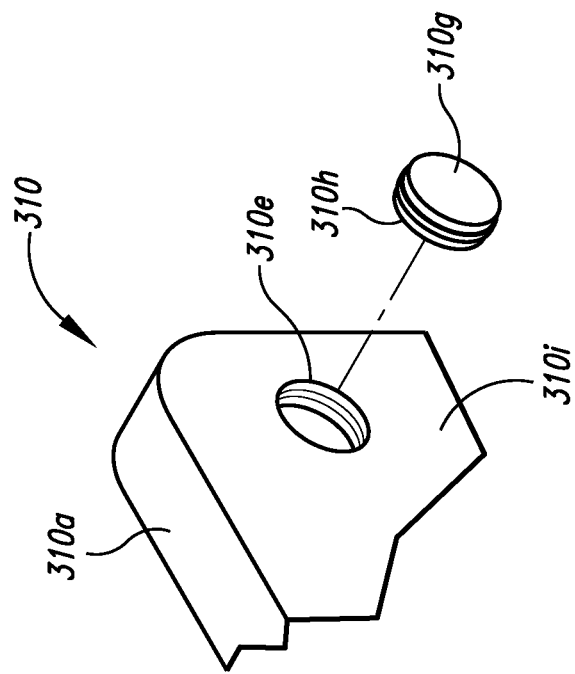
FIG. 28 is a rear perspective magnified exploded view of a portion of the display case assembly for the sixth computer laptop case embodiment.

Turning to FIGS. 27 and 28, fastener plugs 310g having adhesive surface 310h accessible from baseplate portion outer surface 310i are used to fixedly couple display case traylike assembly 310 with display assembly 12 by fastener plugs 310g being placed in apertures 310e to contact back side portion (fifth side portion) 12i thereby affixing display case traylike assembly 310 with display assembly 12. FIG. 29 further shows detail of aperture groove 310j of display case traylike assembly 310 and rib 310k of fastener plugs 310g being use to so affix display case traylike assembly 310 with computing device 30, which represents either display assembly 12 or keyboard assembly 14 of conventional laptop 10.

Figures 30, 31, 32:
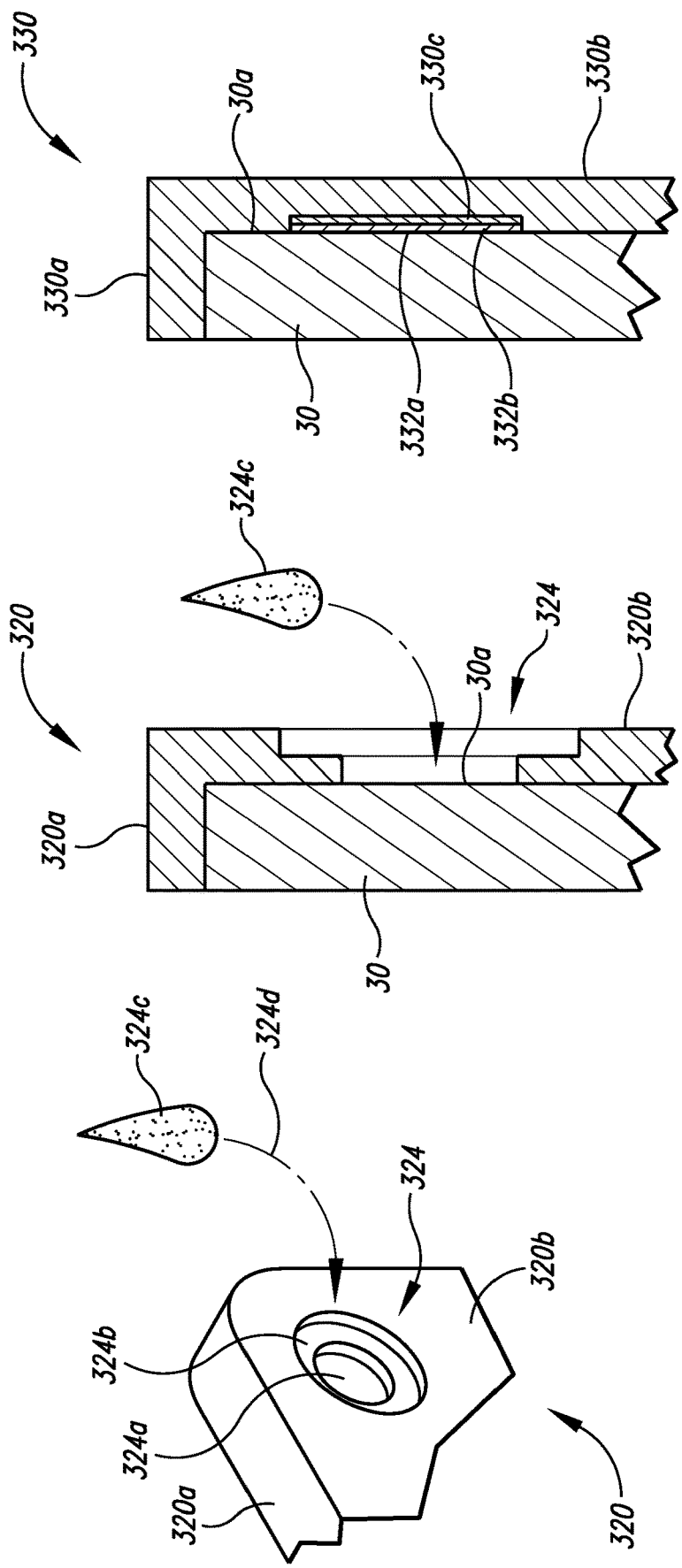
FIG. 30 is a rear perspective magnified view of a case assembly for an eighth computer laptop case embodiment.
FIG. 31 is a cross-sectional magnified view of the case assembly for the eighth computer laptop case embodiment.
FIG. 32 is a cross-sectional magnified view of a case assembly for a ninth computer laptop case embodiment.

Turning to FIG. 30, traylike assembly 320 includes wall portion 320a, baseplate planar portion 310b, and adhesive portal 324, which includes aperture 324a, rim 324b, one or more applications of adhesive 324c, illustrative path 324d, and traylike assembly 320. The traylike assembly 320 can be a single molded piece from a type of plastic or other moldable material or can be constructed from individual pieces. Depicted in FIG. 31, traylike assembly 320 is shown coupled with computing device 30 in which one or more applications of adhesive 324c are about to be introduced to contact computing device 30 of computing device 30 for affixing traylike assembly 320 with computing device 30. In some implementations, adhesive dissolving solvent fluid can be introduced through adhesive portal 324 to be brought into contact with hardened one or more applications of adhesive 324c to dissolve adhesive 324c in order to release computing device 30 from traylike assembly 320 as desired.

Turning to FIG. 31, traylike assembly 330 is depicted as including wall portion 320a, and baseplate planar portion 310b with magnetic material 330c affixed thereupon. The traylike assembly 330 can be a single molded piece from a type of plastic or other moldable material or can be constructed from individual pieces. Furthermore, computing device 30 is shown to be affixed via adhesive side 332a of ferromagnetic metal strip 332b, which is magnetically coupled to magnetic material 330c for securing computing device 30 with traylike assembly 330.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

What is claimed is:

1. A case for an electronic laptop computing device, the device having a display assembly and a keyboard assembly, the case comprising: (I) a keyboard case assembly including (A) a frame structure including (i) a first side portion including (a) a base wall portion, (b) a first wall portion extending substantially perpendicular from the base wall portion, and (c) a second wall portion extending substantially perpendicular from the base wall portion, (d) an end portion positioned on one or more of the base wall portion, the first wall portion, and the second wall portion, (e) a slot longitudinally extended along the base wall portion, wherein the base wall portion, the first wall portion, and the second wall portion structurally arranged to form a first channel, (ii) a second side portion extending substantially perpendicular from the first side portion, the second side portion including (a) a base wall portion, (b) a first wall portion extending substantially perpendicular from the base wall portion, (c) a second wall portion extending substantially perpendicular from the base wall portion, wherein the base wall portion, the first wall portion, and the second wall portion structurally arranged to form a second channel, (iii) a third side portion being substantially perpendicular to the second side portion, the third side portion including (a) a base wall portion, (b) a first wall portion extending substantially perpendicular from the base wall portion, (c) an end portion positioned on one or more of the base wall portion and the first wall portion, (d) a slot longitudinally extended along the base wall portion, wherein the base wall portion, and the first wall portion structurally arranged to form a third channel, and (B) a base structure including (i) a baseplate planar portion including a first edge portion, a second edge portion, and a third edge portion, (ii) a first wall portion perpendicularly extending from the baseplate planar portion, (iii) a second wall portion perpendicularly extending from the baseplate planar portion, wherein the slot of the base wall portion of the first side portion and the slot of the base wall portion of the third side portion positioned to engage with the third edge portion and the first edge portion, of the baseplate planar portion, respectively for coupling of the frame structure with the base structure; and (II) a display case traylike assembly including (A) a baseplate planar portion, (B) a first wall portion extending substantially perpendicularly from the baseplate planar portion, (C) a second wall portion extending substantially perpendicularly from the base plate planar portion, the second wall portion being substantially perpendicular to the first wall portion, (D) a third wall portion extending substantially perpendicularly from the base plate planar portion, the third wall portion being substantially perpendicular to the second wall portion, and (E) a fourth wall portion extending substantially perpendicularly from the base plate planar portion, the fourth wall portion being substantially perpendicular to the third wall portion.

2. The case of claim 1 wherein the frame structure is of a first one-piece molded construction and the base structure is of a second one-piece molded construction.

3. The case of claim 1 wherein the first channel of the first side portion of the frame structure is sized to receive the keyboard assembly of the electronic laptop computing device.

4. The case of claim 1 further including one or more fasteners and wherein the frame structure includes one or more first apertures and the base structure includes one or more second apertures, the one or more first apertures being aligned with the one or more second apertures and the one or more fasteners being positioned therethrough as the frame structure is coupled with the base structure.

5. The case of claim 4 wherein the one or more fasteners are selected from one or more of the following: one or more screws, one or more bolts, one or more plugs, one or more plugs with ribs, and one or more compressible plugs.

6. The case of claim 1 wherein the display case traylike assembly includes one or more apertures configured to receive at least one of the following: one or more plugs and one or more applications of adhesive.

7. The case of claim 1 wherein the display case traylike assembly further includes one or more surface of magnetic material.

8. A case for an electronic laptop computing device, the device having a display assembly and a keyboard assembly, the case comprising: (I) a keyboard case assembly including (A) a frame structure including (i) a first side portion including (a) a base wall portion, (b) a first wall portion extending substantially perpendicular from the base wall portion, and (c) a second wall portion extending substantially perpendicular from the base wall portion, (d) an end portion positioned on one or more of the base wall portion, the first wall portion, and the second wall portion, (e) a slot longitudinally extended along the base wall portion, wherein the base wall portion, the first wall portion, and the second wall portion structurally arranged to form a first channel, (ii) a second side portion extending substantially perpendicular from the first side portion, the second side portion including (a) a base wall portion, (b) a first wall portion extending substantially perpendicular from the base wall portion, (c) a second wall portion extending substantially perpendicular from the base wall portion, wherein the base wall portion, the first wall portion, and the second wall portion structurally arranged to form a second channel, (iii) a third side portion being substantially perpendicular to the second side portion, the third side portion including (a) a base wall portion, (b) a first wall portion extending substantially perpendicular from the base wall portion, (c) an end portion positioned on one or more of the base wall portion and the first wall portion, (d) a slot longitudinally extended along the base wall portion, wherein the base wall portion, and the first wall portion structurally arranged to form a third channel, wherein the keyboard case assembly further includes (B) a base structure including (i) a baseplate planar portion including a first edge portion, a second edge portion, and a third edge portion, (ii) a first wall portion perpendicularly extending from the baseplate planar portion, (iii) a second wall portion perpendicularly extending from the baseplate planar portion, wherein the slot of the base wall portion of the first side portion and the slot of the base wall portion of the third side portion positioned to engage with the third edge portion and the first edge portion, of the baseplate planar portion, respectively for coupling of the frame structure with the base structure.

9. The case of claim 8 wherein the frame structure is of a first one-piece molded construction.

10. The case of claim 8 wherein the first channel of the first side portion of the frame structure is sized to receive the keyboard assembly of the electronic laptop computing device.

11. The case of claim 8 further including one or more fasteners and wherein the frame structure includes one or more first apertures and the base structure includes one or more second apertures, the one or more first apertures being aligned with the one or more second apertures and the one or more fasteners being positioned therethrough as the frame structure is coupled with the base structure.

12. The case of claim 11 wherein the one or more fasteners are selected from one or more of the following: one or more screws, one or more bolts, one or more plugs, one or more plugs with ribs, and one or more compressible plugs.

13. The case of claim 8 wherein the case further includes (II) a display case traylike assembly including (A) a baseplate planar portion, (B) a first wall portion extending substantially perpendicularly from the baseplate planar portion, (C) a second wall portion extending substantially perpendicularly from the base plate planar portion, the second wall portion being substantially perpendicular to the first wall portion, (D) a third wall portion extending substantially perpendicularly from the base plate planar portion, the third wall portion being substantially perpendicular to the second wall portion, and (E) a fourth wall portion extending substantially perpendicularly from the base plate planar portion, the fourth wall portion being substantially perpendicular to the third wall portion.

14. A case for an electronic laptop computing device, the device having a display assembly and a keyboard assembly, the case comprising: (I) a keyboard case assembly including (B) a base structure including (i) a baseplate planar portion including a first edge portion, a second edge portion, and a third edge portion, (ii) a first wall portion perpendicularly extending from the baseplate planar portion, (iii) a second wall portion perpendicularly extending from the baseplate planar portion, wherein the keyboard case assembly further includes (A) a frame structure including (i) a first side portion including (a) a base wall portion, (b) a first wall portion extending substantially perpendicular from the base wall portion, and (c) a second wall portion extending substantially perpendicular from the base wall portion, (d) an end portion positioned on one or more of the base wall portion, the first wall portion, and the second wall portion, (e) a slot longitudinally extended along the base wall portion, wherein the base wall portion, the first wall portion, and the second wall portion structurally arranged to form a first channel, (ii) a second side portion extending substantially perpendicular from the first side portion, the second side portion including (a) a base wall portion, (b) a first wall portion extending substantially perpendicular from the base wall portion, (c) a second wall portion extending substantially perpendicular from the base wall portion, wherein the base wall portion, the first wall portion, and the second wall portion structurally arranged to form a second channel, (iii) a third side portion being substantially perpendicular to the second side portion, the third side portion including (a) a base wall portion, (b) a first wall portion extending substantially perpendicular from the base wall portion, (c) an end portion positioned on one or more of the base wall portion and the first wall portion, (d) a slot longitudinally extended along the base wall portion, wherein the base wall portion, and the first wall portion structurally arranged to form a third channel.

15. The case of claim 14 wherein the case further includes (II) a display case traylike assembly including (A) a baseplate planar portion, (B) a first wall portion extending substantially perpendicularly from the baseplate planar portion, (C) a second wall portion extending substantially perpendicularly from the base plate planar portion, the second wall portion being substantially perpendicular to the first wall portion, (D) a third wall portion extending substantially perpendicularly from the base plate planar portion, the third wall portion being substantially perpendicular to the second wall portion, and (E) a fourth wall portion extending substantially perpendicularly from the base plate planar portion, the fourth wall portion being substantially perpendicular to the third wall portion.

16. The case of claim 15 wherein the display case traylike assembly includes one or more apertures configured to receive at least one of the following: one or more plugs and one or more applications of adhesive.

17. The case of claim 16 wherein the display case traylike assembly further includes one or more surface of magnetic material.

18. The case of claim 14 wherein the slot of the base wall portion of the first side portion and the slot of the base wall portion of the third side portion positioned to engage with the third edge portion and the first edge portion, of the baseplate planar portion, respectively for coupling of the frame structure with the base structure.

* * * * *